United States Patent
Kato

(10) Patent No.: US 9,773,188 B2
(45) Date of Patent: Sep. 26, 2017

(54) INFORMATION PROCESSING APPARATUS, IMAGING APPARATUS, INFORMATION PROCESSING SYSTEM, INFORMATION PROCESSING METHOD, AND PROGRAM FOR REMOVING UNWANTING OBJECTS FROM IMAGES

(71) Applicant: CANON KABUSHIKI KAISHA, Tokyo (JP)

(72) Inventor: Yuji Kato, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 467 days.

(21) Appl. No.: 14/325,138

(22) Filed: Jul. 7, 2014

(65) Prior Publication Data

US 2015/0015678 A1    Jan. 15, 2015

(30) Foreign Application Priority Data

Jul. 9, 2013 (JP) ................................ 2013-143695
Apr. 11, 2014 (JP) ................................ 2014-082017

(51) Int. Cl.
| | | |
|---|---|---|
| *H04N 13/02* | (2006.01) | |
| *G06K 9/46* | (2006.01) | |
| *G06T 5/00* | (2006.01) | |
| *G06T 5/50* | (2006.01) | |

(52) U.S. Cl.
CPC ............ *G06K 9/4604* (2013.01); *G06T 5/005* (2013.01); *G06T 5/50* (2013.01); *G06K 9/4671* (2013.01); *H04N 13/0242* (2013.01)

(58) Field of Classification Search
CPC .... G06K 9/4604; G06K 9/4671; G06T 5/005; G06T 5/50; H04N 13/0242
USPC ........................................................... 348/50
See application file for complete search history.

(56) References Cited

U.S. PATENT DOCUMENTS

| | | | |
|---|---|---|---|
| 2008/0107306 A1* | 5/2008 | Matsuzawa ............ G06K 9/346 382/106 |
| 2011/0122308 A1* | 5/2011 | Duparre ............ H01L 27/14621 348/340 |
| 2011/0293142 A1* | 12/2011 | van der Mark ....... G06T 7/0028 382/103 |
| 2015/0213636 A1* | 7/2015 | Herling ................... G06T 5/005 382/218 |
| 2015/0325038 A1* | 11/2015 | Baker ................ H04N 13/0007 345/426 |

FOREIGN PATENT DOCUMENTS

JP    2008-117305 A    5/2008

* cited by examiner

*Primary Examiner* — Francis G Geroleo
(74) *Attorney, Agent, or Firm* — Canon U.S.A. Inc., IP Division

(57) ABSTRACT

A camera includes an unwanted object shape acquisition unit, a viewpoint selection unit, and an unwanted object removal unit. The viewpoint selection unit selects a plurality of viewpoints based on information regarding a shape of an unwanted object in a subject, which is acquired by the unwanted object shape acquisition unit. The unwanted object removal unit performs unwanted object removal processing with use of images corresponding to the viewpoints selected by the viewpoint selection unit.

15 Claims, 29 Drawing Sheets

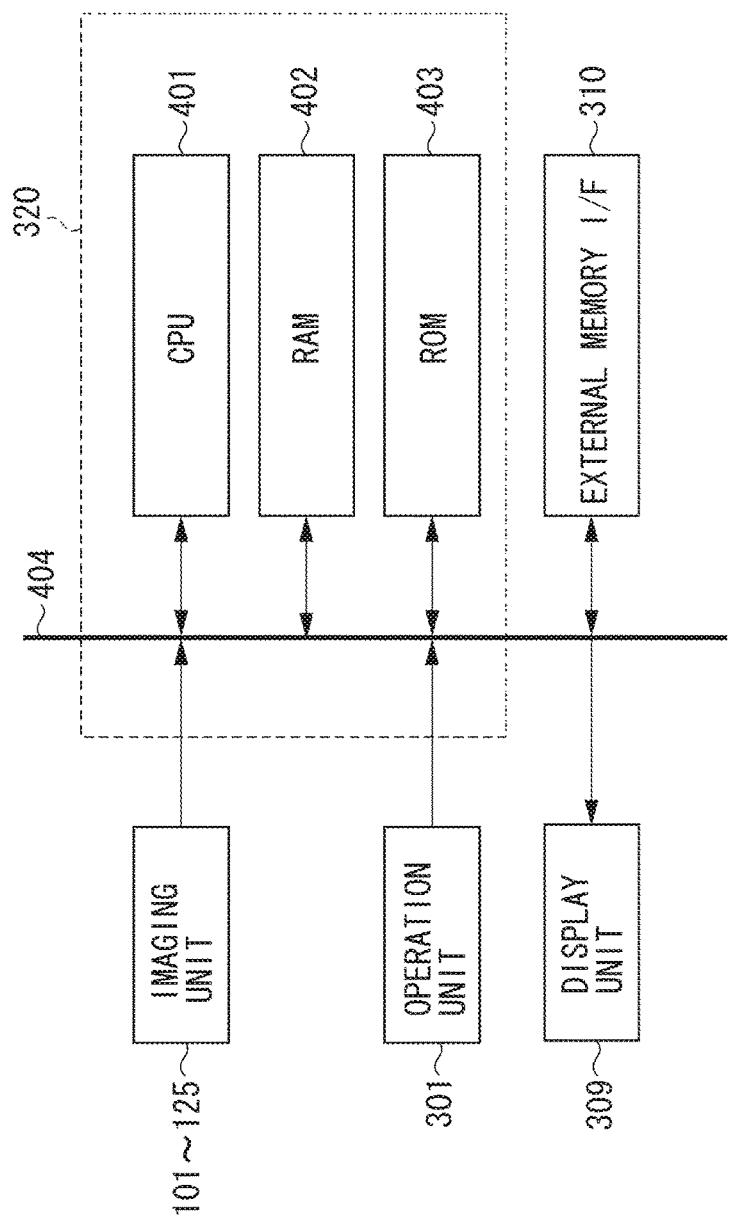

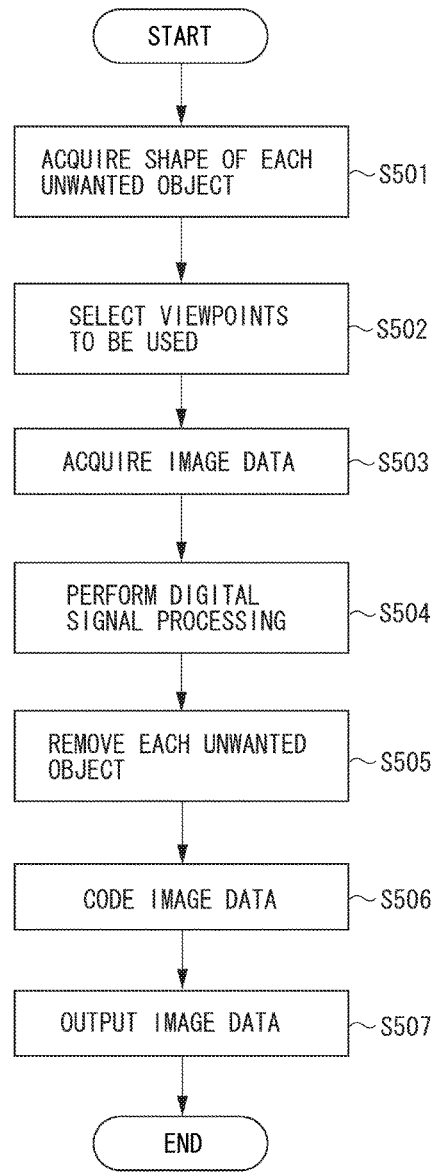

FIG. 10A

| PAIR OF VIEWPOINTS | $\theta$ | l |
|---|---|---|
| 1, 2 | xx | xx |
| 1, 3 | xx | xx |
| 1, 4 | xx | xx |
| ... | ... | ... |

FIG. 10B

| SET OF VIEWPOINTS | $\theta_1$ | $\theta_2$ | $\theta_3$ | $\theta_4$ | $\theta_5$ | $\theta_6$ | $l_{avg}$ |
|---|---|---|---|---|---|---|---|
| 1, 2, 3, 4 | xx | xx | xx | xx | xx | xx | xx |
| 1, 2, 3, 5 | xx | xx | xx | xx | xx | xx | xx |
| 1, 2, 3, 6 | xx | xx | xx | xx | xx | xx | xx |
| ... | ... | ... | ... | ... | ... | ... | ... |

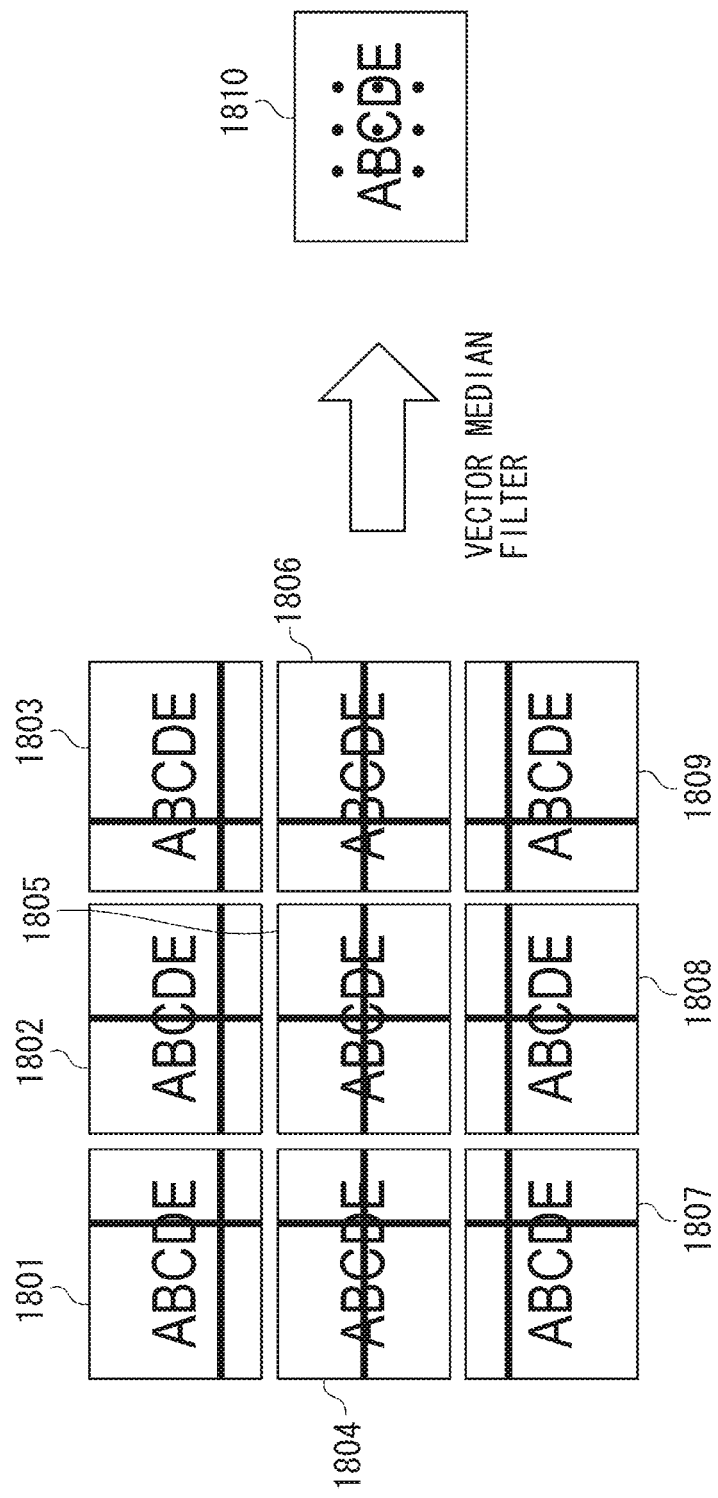

FIG. 24B
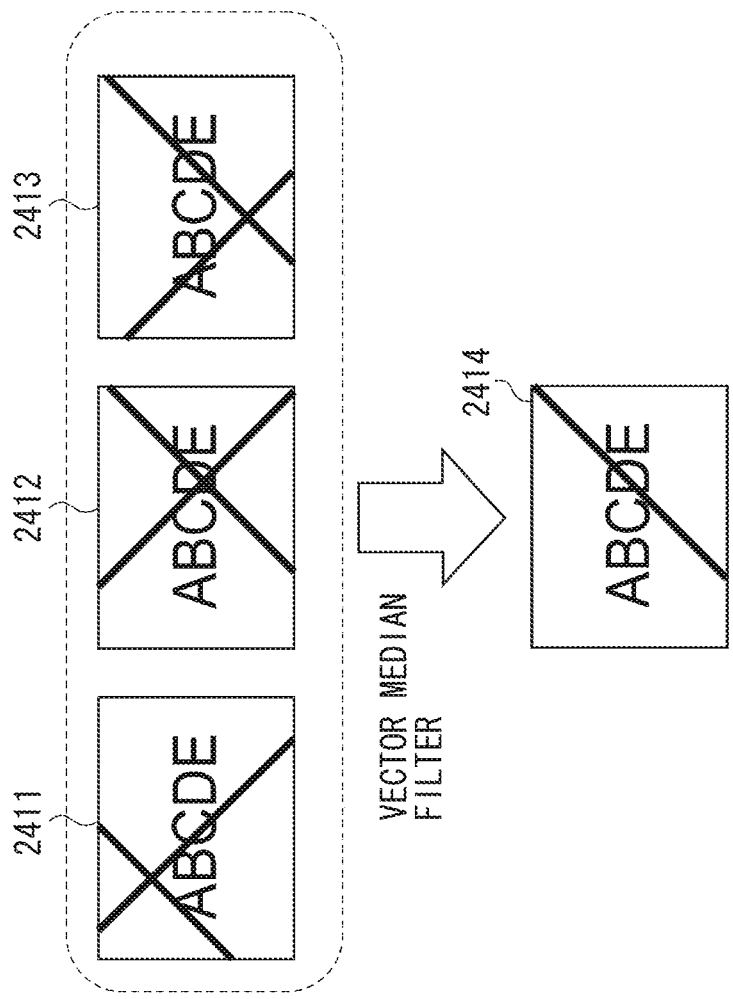
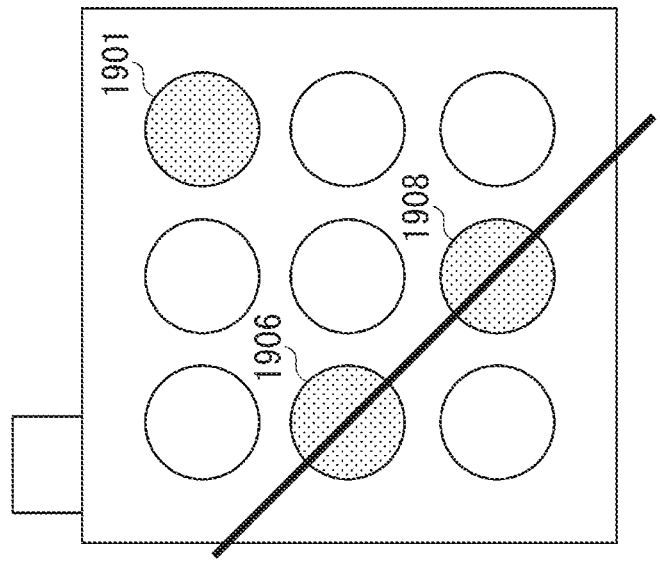

INFORMATION PROCESSING APPARATUS, IMAGING APPARATUS, INFORMATION PROCESSING SYSTEM, INFORMATION PROCESSING METHOD, AND PROGRAM FOR REMOVING UNWANTING OBJECTS FROM IMAGES

BACKGROUND OF THE INVENTION

Field of the Invention

The present invention relates to a technique for removing an unwanted object from an image with use of a plurality of images shot from different viewpoints.

Description of the Related Art

In recent years, there has been known an image processing technique for removing a predetermined object in a subject with use of images acquired by shooting the subject from a plurality of viewpoints (hereinafter referred to as multi-viewpoint images). For example, Japanese Patent Application Laid-Open No. 2008-117305 discusses a technique for removing an unwanted object in a subject with use of images acquired by a stereo camera. According to the technique discussed in Japanese Patent Application Laid-Open No. 2008-117305, the unwanted object is removed by replacing pixel values in a portion where the subject is hidden by the unwanted object (an occlusion region) based on images acquired from different viewpoints.

When an unwanted object is to be removed with use of images acquired by a twin-lens stereo camera, like the technique discussed in Japanese Patent Application Laid-Open No. 2008-117305, it is difficult to remove a linear unwanted object extending in parallel with a straight line defined by two viewpoints corresponding to the stereo camera. Therefore, a possible solution therefor is to remove the unwanted object by acquiring images with use of an array camera capable of shooting a subject from a larger number of viewpoints to deal with and remove various kinds of unwanted objects. However, when the unwanted object removal processing is performed with use of all the images acquired by the array camera, an information processing amount increases in removing the unwanted object.

SUMMARY OF THE INVENTION

Therefore, the present invention is directed to a reduction in the information processing amount in the unwanted object removal with use of the multi-viewpoint images.

According to an aspect of the present invention, an information processing apparatus, which is configured to process a plurality of images acquired by imaging corresponding to different viewpoint positions, includes an acquisition unit configured to acquire information regarding a shape of an unwanted object included in the plurality of images, a selection unit configured to select a plurality of viewpoint positions from among the viewpoint positions from which the images can be acquired by the imaging, based on the information regarding the shape of the unwanted object, and a generation unit configured to generate image data in which at least a part of an image of the unwanted object is not included, with use of a plurality of images corresponding to the selected plurality of viewpoint positions.

Further features of the present invention will become apparent from the following description of exemplary embodiments with reference to the attached drawings.

BRIEF DESCRIPTION OF THE DRAWINGS

FIG. 4 illustrates a configuration of an information processing unit of the camera according to the first exemplary embodiment.

FIG. 5 is a flowchart illustrating processing by the camera according to the first exemplary embodiment.

FIGS. 10A and 10B illustrate tables used in the viewpoint selection processing according to the first exemplary embodiment.

FIGS. 18A and 18B illustrate an overview of unwanted object removal processing according to a fourth exemplary embodiment.

FIGS. 24A and 24B each illustrate a relationship between an unwanted object and viewpoints according to the fourth exemplary embodiment.

DESCRIPTION OF THE EMBODIMENTS

Various exemplary embodiments, features, and aspects of the invention will be described in detail below with reference to the drawings.

A first exemplary embodiment of the present invention deals with an array camera that includes a plurality of imaging units and selects imaging units to be used in image acquisition according to a shape of an unwanted object. The array camera according to the present exemplary embodiment acquires and processes images while efficiently selecting appropriate viewpoints for a removal of the unwanted object by combining images, and therefore can reduce an information processing amount and a power consumption amount.

Figure 1:
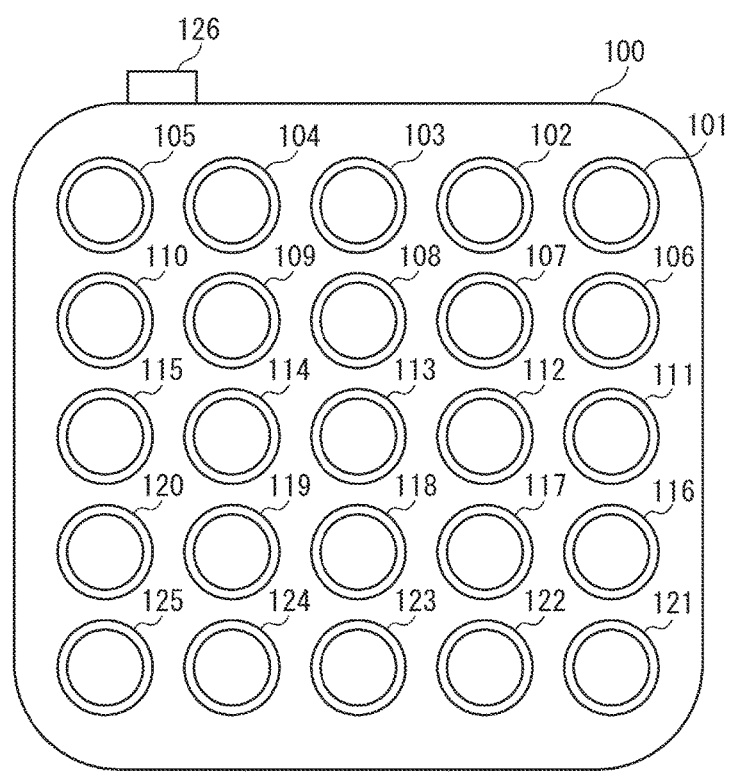
FIG. 1 illustrates an outer appearance of a camera according to a first exemplary embodiment.

FIG. 1 illustrates an array camera 100 (hereinafter referred to as a camera 100) according to the present exemplary embodiment. The camera 100 includes twenty-five imaging units 101 to 125 each configured to acquire a color image, and a shooting button 126. As illustrated in FIG. 1, the twenty-five imaging units 101 to 125 are evenly arranged in a two-dimensional lattice manner.

Figure 2:
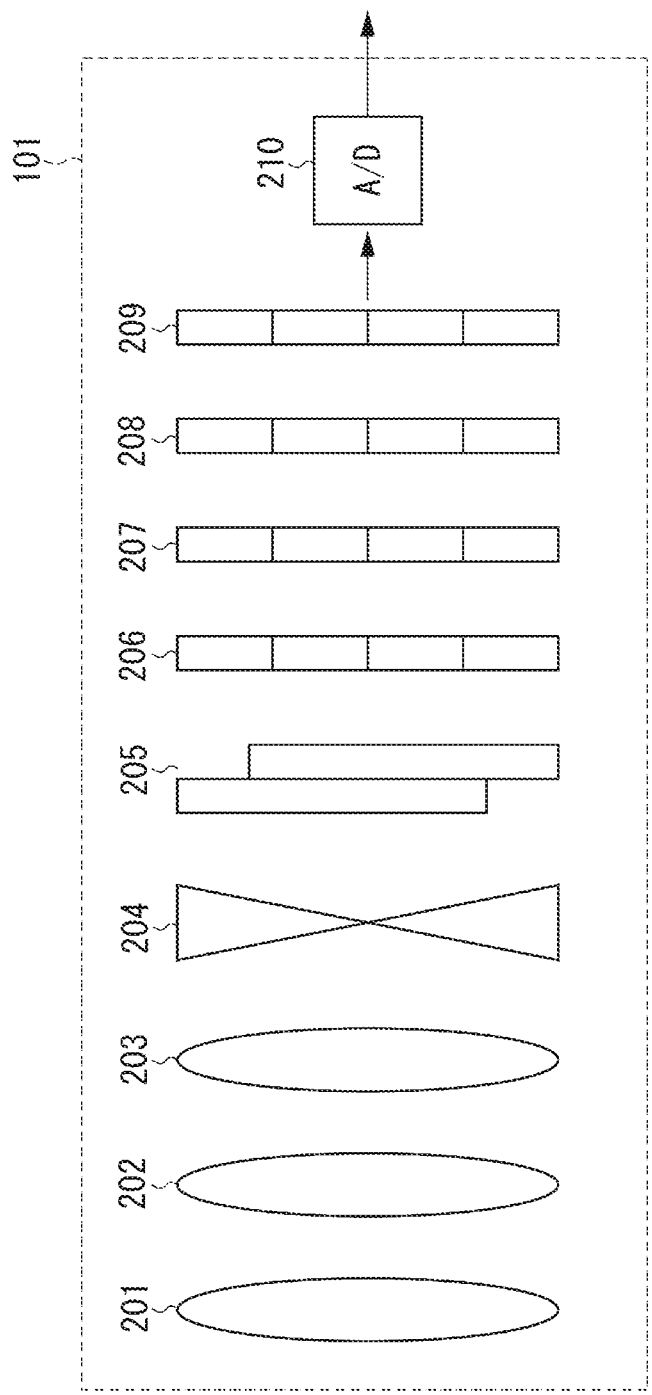
FIG. 2 illustrates a configuration of an imaging unit of the camera according to the first exemplary embodiment.

FIG. 2 illustrates an internal configuration of each of the imaging units 101 to 125. The imaging units 101 to 125 are similarly configured, therefore, only a configuration of the imaging unit 101 will be described here. The imaging unit 101 includes lenses 201 to 203, a diaphragm 204, a shutter 205, an optical low-pass filter 206, an infrared ray (iR) cut filter 207, a color filter 208, a sensor 209, and an analog/digital (A/D) conversion unit 210. The lenses 201 to 203 are a zoom lens 201, a focus lens 202, and a blur correction lens 203, respectively. The sensor 209 is an image sensor such as a complementary metal-oxide semiconductor (CMOS) or a charge coupled device (CCD), and detects light focused by the above-described lenses to convert it into an electric signal. The detected light is output from the sensor 209 as an analog value, is converted into a digital value by the A/D conversion unit 210, and is then output as digital color image data.

By such an array camera, it is possible to acquire a color image group formed by viewing a same subject from a plurality of viewpoint positions. In the present example, the number of imaging units is twenty-five, but the number of imaging units is not limited to twenty-five. The number of imaging units may be any number as long as the imaging apparatus includes a plurality of imaging units.

Figure 3:
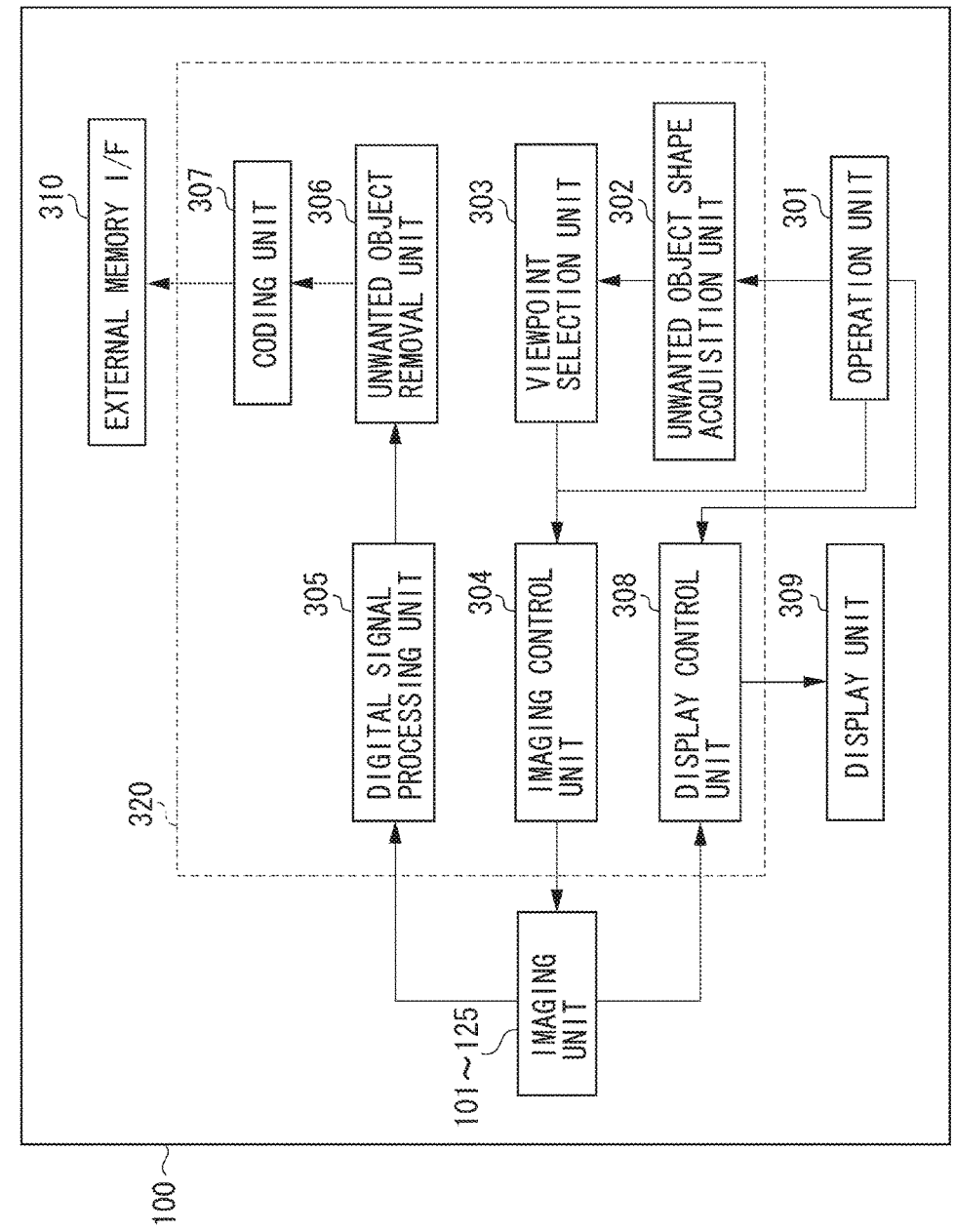
FIG. 3 illustrates a configuration of the camera according to the first exemplary embodiment.

FIG. 3 is a block diagram illustrating a configuration of the camera 100.

The camera 100 includes an operation unit 301, a display unit 309, an external memory control unit 310, and an information processing unit 320, in addition to the imaging units 101 to 125. Further, the information processing unit 320 has functions as an unwanted object shape acquisition unit 302, a viewpoint selection unit 303, an imaging control unit 304, a digital signal processing unit 305, an unwanted object removal unit 306, a coding unit 307, and a display control unit 308.

The operation unit 301 is an input device such as a button, a dial, and a touch panel mounted on a camera main body, and a user can issue an instruction for a start of shooting, a stop of shooting, a setting of a shooting condition, and the like by operating the operation unit 301. In the present exemplary embodiment, the operation unit 301 includes a touch panel, and the user can designate a shape of an unwanted object that should be removed by performing a sliding operation on the touch panel.

The display unit 309 is a device that displays an image acquired by the imaging units 101 to 125 and a character. Further, in the present exemplary embodiment, the display unit 309 performs a live view display, which displays an imaging range of the imaging unit 113 in real time. A video image displayed on the display unit 309 is generated and output by the display control unit 308. An imaging unit used for this live view display and the like can be freely changed by processing of the display control unit 308. In the present exemplary embodiment, the touch panels included in the display unit 309 and the operation unit 301 are integrally configured, and the user can perform a touch operation as if tracing an image displayed on the display unit 309.

The external memory interface (I/F) 310 is an interface that connects a personal computer (PC) or various media (a hard disk, a memory card, a compact flash (CF) card, a secure digital (SD) card, a universal serial bus (USB) memory, and the like) to the camera 100. In the present exemplary embodiment, this external memory I/F 310 is an SD card slot, and an SD card for storing image data is inserted therein.

The information processing unit 320 controls various kinds of processing performed in the camera 100. FIG. 4 illustrates a hardware configuration of the information processing unit 320. The information processing unit 320 includes a central processing unit (CPU) 401, a random access memory (RAM) 402, and a read only memory (ROM) 403. The respective constituent units are connected to one another via a system bus 404.

The CPU 401 is a processor that comprehensively controls the respective units in the camera 100. The RAM 402 functions as a main memory, a work area, and the like of the CPU 401. The ROM 403 stores a group of programs to be executed by the CPU 401. The CPU 401 reads in and executes the program stored in the ROM 403 as a program code, with which the information processing unit 320 realizes the respective functional blocks that the information processing unit 320 has. Besides the above-described example, the information processing unit 320 may include, for example, a dedicated processing circuit(s) that serve(s) as a part or all of the respective constituent units illustrated in FIG. 3.

The camera 100 according to the present exemplary embodiment is configured in the above-described manner.

Next, an overview of unwanted object removal processing performed in the camera 100 will be described. FIG. 5 is a flowchart illustrating the unwanted object removal processing performed in the camera 100.

First, in step S501, the unwanted object shape acquisition unit 302 acquires a shape of an unwanted object based on an operation performed on the operation unit 301, and outputs information that indicates the acquired shape of the unwanted object to the viewpoint selection unit 303. In the present exemplary embodiment, the shape of the unwanted object is acquired based on a locus of a sliding operation performed by the user on the touch panel.

Figure 6A:
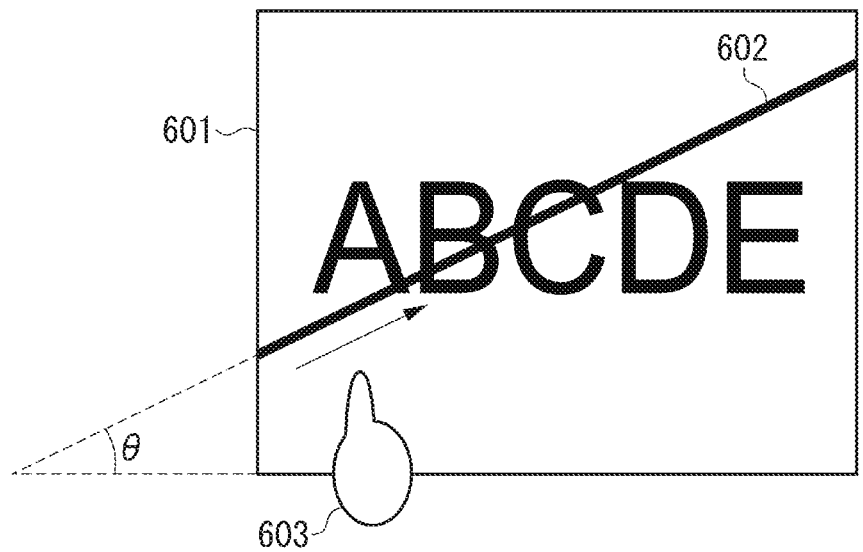
FIGS. 6A and 6B illustrate a method for acquiring a shape of an unwanted object according to the first exemplary embodiment.
Figure 6B:
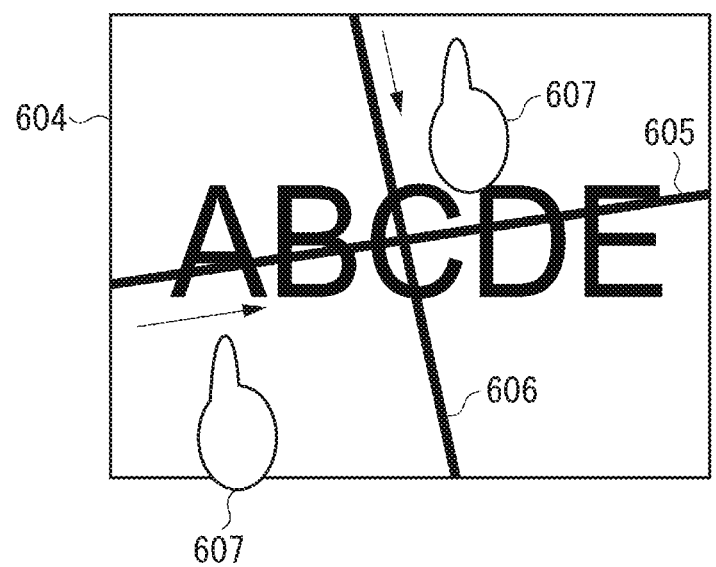

FIGS. 6A and 6B illustrate a method for acquiring the shape of the unwanted object based on the sliding operation. Images 601 and 604 are live view images displayed on the display unit 309. Further, straight lines 602, 605, and 606 are images of unwanted objects included in the images 601 and 604. Alphabets ABCDE displayed in the images 601 and 604 are a target subject, and the unwanted objects indicated by the straight lines 602, 605, and 606 exist between the target subject and the camera 100. Further, user's hands 603 and 607 perform touch operations.

As illustrated in FIG. 6A, the hand 603 performs the touch operation as if tracking the straight line 602, which is the image of the unwanted object displayed on the display unit 309, with a finger. Information that indicates a touched position detected at this time is input into the unwanted object shape acquisition unit 302. A coordinate of a touched point is detected for every 20 ms, and each group of continuously detected touched points is recognized as a single touched point group. In other words, when the hand 607 performs touch operations at different points of time by tracking the straight lines 605 and 606, respectively, as illustrated in FIG. 6B, a touched point group acquired by tracking one of the straight lines 605 and 606, and a touched point group acquired by tracking another straight line are distinguished from each other.

When the touched point information is input, the unwanted object shape acquisition unit 302 acquires the shape of the unwanted object for each touched point group based on this touched point information. Suppose here that twenty touched points are detected in some touched point group, and these detected points are named points P1 to P20 in temporal order of the detection, respectively. At this time, the unwanted object shape acquisition unit 302 calculates a slope of a straight line passing through two points for all pairs of temporally adjacent touched points, such as a slope between the points P1 and P2 and a slope between the points P2 and P3, based on the coordinates of the detected touched points. At this time, this slope is calculated as an angle $\theta$ ($-180°\leq\theta\leq180°$) defined by the straight line of the unwanted object and an axis extending along a horizontal direction of the screen, as illustrated in FIG. 6A. In this calculation, regarding angles that indicate a same straight line such as 150° and −30°, one of them is selected based on a positional relationship between the two touched points in consideration of the temporal order therebetween. For example, if the touched point shifts between the points P1 and P2 in a lower right direction in the screen, the angle $\theta$ is calculated as −30°.

Subsequently, the unwanted object shape acquisition unit 302 divides the touched points P1 to P20 into four blocks each constituted by five points, and calculates an average value of the slopes corresponding to the pairs of touched points included in each block. The calculated average value is set as a slope for each block. Then, the unwanted object shape acquisition unit 302 calculates an average value of the slopes of all the blocks, and compares this average value with the slope of each block. The unwanted object shape acquisition unit 302 calculates an angle defined by a straight line having the slope corresponding to each block and a straight line having the slope corresponding to the average value of the slopes of the blocks. If there is a block for which the calculated angle is 30 degrees or larger, the unwanted object is recognized as a curved-line shape. Otherwise, the unwanted object is recognized as a straight-line shape, and the average value of the slopes of the respective blocks is output as a slope of this straight line. At this time, if the angle $\theta$ has a negative value, the angle $\theta$ is output after being converted into a value in a range of $0°\leq\theta\leq180°$ that indicates the same straight line. In other words, at this time, a longitudinal direction of the unwanted object is detected.

The method used to acquire a shape of an unwanted object is not limited to the above-described example. For example, the unwanted object shape acquisition unit 302 may perform straight-line approximation using the least square method on touched points, and determine the shape based on a correlation function.

Further, how many points are assigned into each block when touched points are divided into blocks is not limited to the above-described example, and the threshold value used to determine whether the shape is a curved-line shape or a straight-line shape is also not limited to the above-described value.

Subsequently, in step S502, the viewpoint selection unit 303 selects viewpoints to be used to capture images based on information that indicates the shape of the unwanted object acquired in step S501, and outputs information that indicates the selected viewpoints to the imaging control unit 304. The processing performed here will be described in detail below.

Subsequently, in step S503, the imaging control unit 304 outputs command signals for capturing images to imaging units corresponding to the viewpoints selected in step S502, and the imaging units that have received the command signals acquire image data by capturing the images.

Subsequently, in step S504, the digital signal processing unit 305 receives the image data output from the imaging units that have captured the images, and performs processing such as white balance processing, gamma processing, and noise reduction processing on the received image data. The digital signal processing unit 305 outputs the processed image data to the unwanted object removal unit 306.

Subsequently, in step S505, the unwanted object removal unit 306 generates image data with the unwanted object removed therefrom by using the image data acquired from the digital signal processing unit 305, and outputs the generated image data to the coding unit 307. This processing will be described in detail below.

Subsequently, in step S506, the coding unit 307 performs coding processing on the image data acquired from the unwanted object removal unit 306. Commonly-used coding processing, such as Joint Photographic Experts Group (JPEG) or Portable Network Graphics (PNG), can be used as the coding processing to be performed here.

Lastly, in step S507, the external memory I/F 310 outputs the image data with the unwanted object removed therefrom, into the external memory. In the present exemplary embodiment, the image data is output and stored into the SD card.

The above is the processing performed in the camera 100. Next, the processing for selecting the viewpoints to be used (step S502) and the processing for removing the unwanted object (step S505) will be described in detail.

In the present exemplary embodiment, the viewpoints to be used in image acquisition for a removal of an unwanted object are selected based on the acquired shape of the unwanted object. If there is an unwanted object having a curved-line shape, or if there are only unwanted objects having straight-line shapes and the number of them is three or more, it is difficult to efficiently select viewpoints. Therefore, in these cases, the viewpoint selection unit 303 selects all of the viewpoints, and images are acquired by the imaging units 101 to 125.

If there is only a single unwanted object having a straight-line shape, the viewpoint selection unit 303 selects two viewpoints in addition to the viewpoint used in the live view display. Further, if there are two unwanted objects having straight-line shapes, the viewpoint selection unit 303 selects four viewpoints in addition to the viewpoint used in the live view display. This processing will be described with reference to FIGS. 7A and 7B.

Figure 7A:
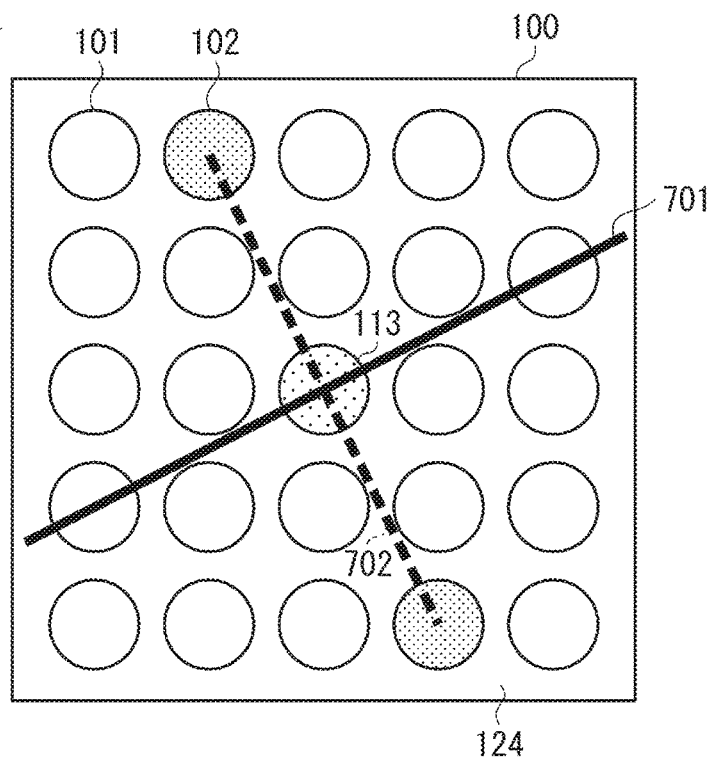
FIGS. 7A and 7B illustrate a method for selecting viewpoints according to the first exemplary embodiment.
Figure 7B:
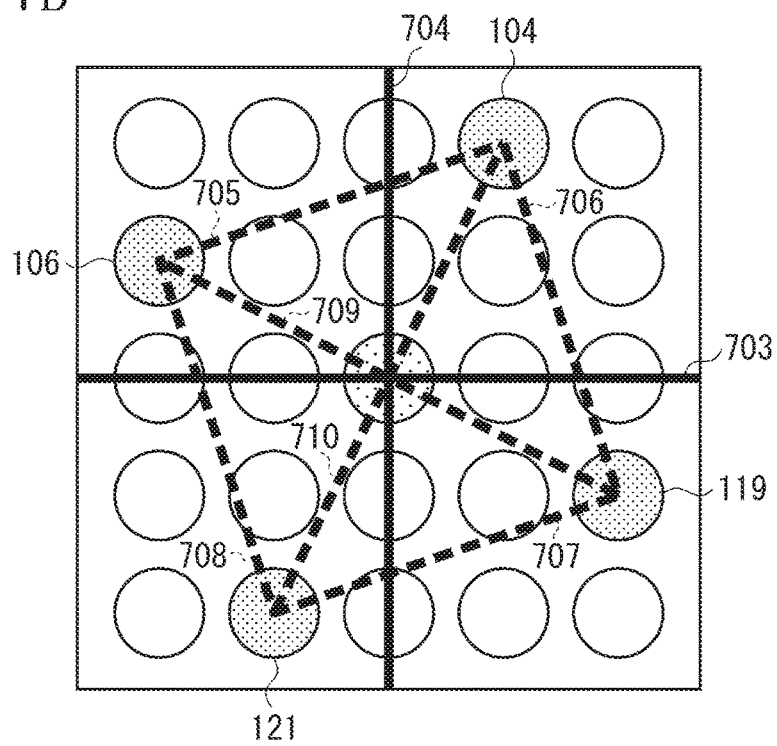

FIGS. 7A and 7B each illustrate a positional relationship among the imaging units 101 to 125 and unwanted objects 701, 703, and 704 as viewed from a back surface of the camera 100. Basically, the viewpoint selection unit 303 selects as the viewpoints to be used points having a large parallax between or among them and capable of complementing an occlusion region corresponding to a background hidden by each unwanted object. In other words, the viewpoint selection unit 303 selects viewpoints having pixel regions to be occupied by each unwanted object in images corresponding to each viewpoint, so as to be able to complement each other pixel values in the respective occlusion regions.

If there is only a single unwanted object having a straight-line shape as illustrated in FIG. 7A, the viewpoint selection unit 303 selects a combination that maximizes an angle defined by a line segment (for example, a line segment 702)

connecting central points of two viewpoints, and the straight line (for example, the straight line 701) of the unwanted object. If there is a plurality of candidates, the viewpoint selection unit 303 selects from these candidates a combination that maximizes a length of the line segment connecting the central points of the two viewpoints.

On the other hand, if there are two unwanted objects having straight-line shapes as illustrated in FIG. 7B, first, the viewpoint selection unit 303 calculates angles defined by six line segments (for example, line segments 705 to 710) connecting central points of four viewpoints and the two straight lines (for example, the straight lines 703 and 704) of the unwanted objects. Subsequently, the viewpoint selection unit 303 extracts a minimum value from twelve angles acquired from the calculation, and selects a combination that maximizes this value. This is because the occlusion regions can be more efficiently complemented when there is no pair extending substantially in parallel with the straight lines of the unwanted objects among the pairs of the respective viewpoints.

Figure 8:
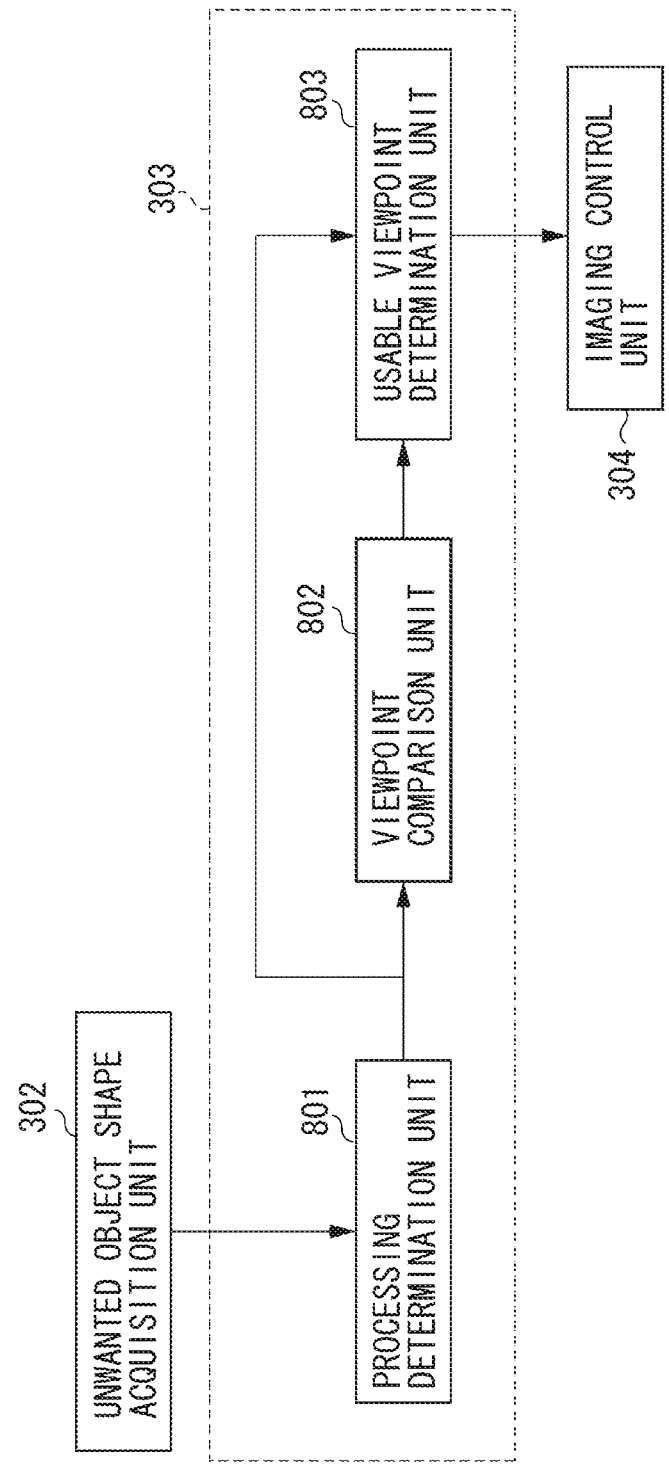
FIG. 8 illustrates a configuration of a viewpoint selection unit according to the first exemplary embodiment.

FIG. 8 is a block diagram illustrating a configuration of the viewpoint selection unit 303. Functions of respective blocks illustrated in FIG. 8 are also realized by the CPU 401, but a part thereof may be replaced with a dedicated processing circuit(s) or the like.

Figure 9:
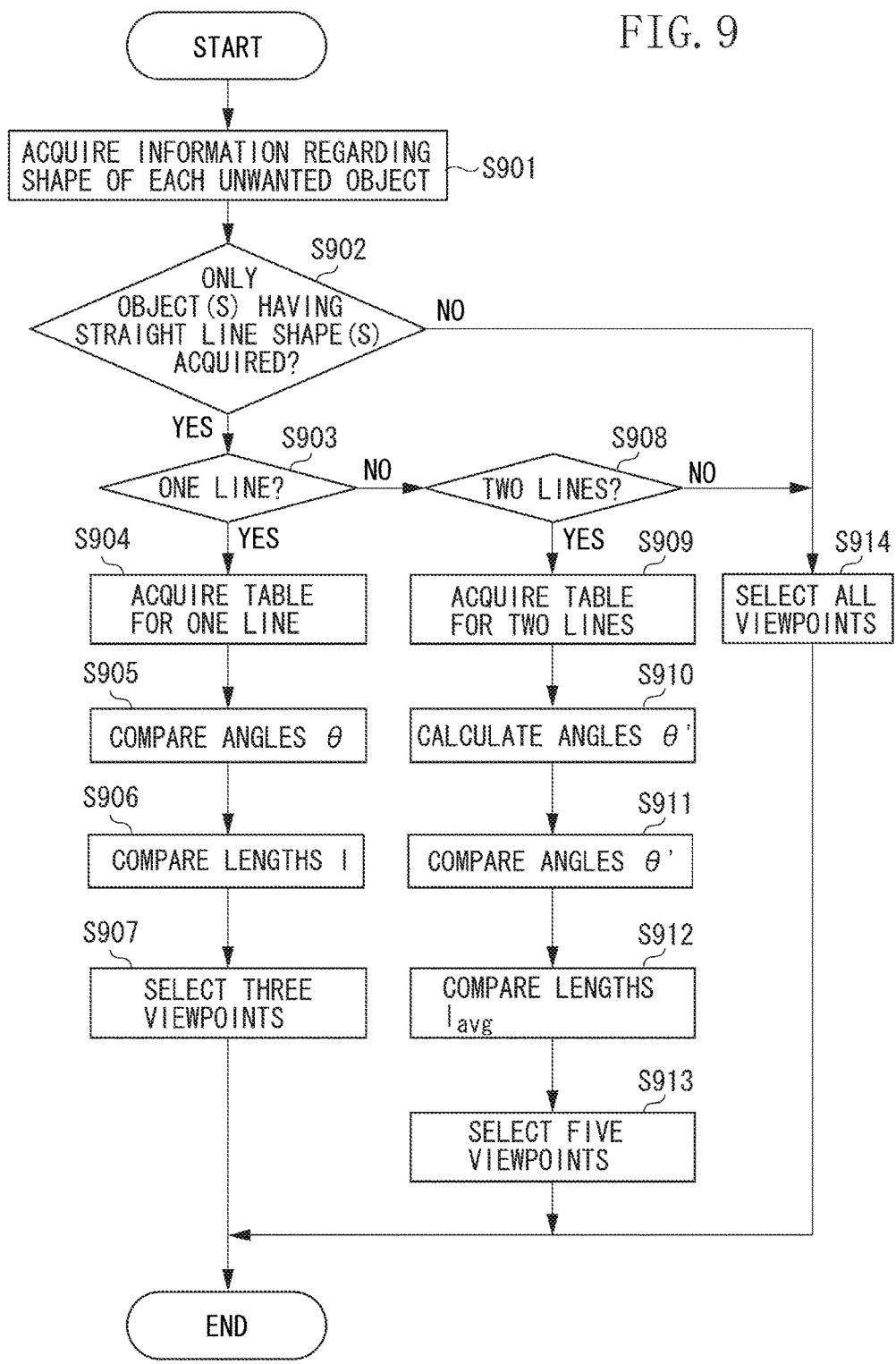
FIG. 9 is a flowchart illustrating processing by the viewpoint selection unit according to the first exemplary embodiment.

In the following description, the processing performed by the viewpoint selection unit 303 (step S502) will be described. FIG. 9 is a flowchart illustrating the processing performed by the viewpoint selection unit 303.

First, in step S901, a processing determination unit 801 acquires the information regarding the shape(s) of the unwanted object(s), which is output from the unwanted object shape acquisition unit 302.

Subsequently, in step S902, the processing determination unit 801 determines whether there is an unwanted object having a curved-line shape. If there is an unwanted object having a curved-line shape (NO in step S902), the processing proceeds to step S914. If there is no unwanted object having a curved-line shape and there is/are only an unwanted object(s) having a straight-line shape(s) (YES in step S902), the processing proceeds to step S903.

Subsequently, in step S903, the processing determination unit 801 determines whether there is only a single unwanted object having a straight-line shape. If there is only a single unwanted object having a straight-line shape (YES in step S903), the processing determination unit 801 outputs the acquired information regarding the shape of the unwanted object to a viewpoint comparison unit 802. Then, the processing proceeds to step S904. If it is not a single unwanted object which has a straight-line shape (NO in step S903), the processing proceeds to step S908.

If there is no unwanted object having a curved-line shape and there are two or more unwanted objects having straight-line shapes (NO in step S903), in step S908, the processing determination unit 801 determines whether there are only two unwanted objects having straight-line shapes. If there are only two unwanted objects having straight-line shapes (YES in step S908), the processing determination unit 801 outputs the acquired information regarding the shapes of the unwanted objects to the viewpoint comparison unit 802. Then, the processing proceeds to step S909. If there are three or more unwanted objects having straight-line shapes (NO in step S908), the processing proceeds to step S914.

Processing under each of the conditions will be described as follows.

First, if there is no unwanted object having a curved-line shape and there is only a single unwanted object having a straight-line shape (YES in step S903), in step S904, the viewpoint comparison unit 802 acquires a look-up table for processing a single straight line illustrated in FIG. 10A. The look-up table for processing a single straight line stores an angle θ defined by a line segment connecting two viewpoints and the axis extending along the horizontal direction of the screen, and a length of this line segment for each of all pairs when two viewpoints are extracted from the twenty-four viewpoints except for the viewpoint used in the live view display.

Subsequently, in step S905, the viewpoint comparison unit 802 compares the angles θ indicated in the look-up table acquired in step S904 to one another to select pairs of viewpoints corresponding to a largest angle defined by the line segment therebetween and the straight line of the unwanted object.

Subsequently, in step S906, the viewpoint comparison unit 802 further selects a pair corresponding to a largest value of the length l from the pairs of viewpoints selected in step S905. If the candidate is narrowed down to a single pair in step S905, this process does not have to be performed. Further, the present exemplary embodiment may be configured in such a manner that, regarding pairs of viewpoints that have a same value as the angle θ, other pairs than a pair corresponding to a largest value of the length l may not be stored in the look-up table from the first.

Lastly, in step S907, a usable viewpoint determination unit 803 determines the two viewpoints selected by the viewpoint comparison unit 802 and the single viewpoint used in the live view display, i.e., three viewpoints in total, as the viewpoints to be used in image acquisition, and outputs a command signal to the imaging control unit 304. Then, the processing ends. At this time, if the pairs of viewpoints are not narrowed down to a single pair, the usable viewpoint determination unit 803 randomly selects a single pair from them with use of a random number. Alternatively, the present exemplary embodiment may be configured such that use histories of the imaging units 101 to 125 until then or the like are stored, and the usable viewpoint determination unit 803 preferentially selects a pair that has been less frequently used.

The above is the processing performed when there is only a single unwanted object having a straight-line shape.

On the other hand, if there are only two unwanted objects having straight-line shapes (YES in step S908), in step S909, the viewpoint comparison unit 802 acquires a look-up table for processing two straight lines illustrated in FIG. 10B. The look-up table for processing two straight lines stores all combinations obtained when four viewpoints are extracted from the twenty-four viewpoints except for the viewpoint used in the live view display. Further, the look-up table for processing two straight lines stores angles $\theta_1$ to $\theta_6$ defined between six line segments each connecting two viewpoints arbitrarily extracted from the four viewpoints and the axis extending along the horizontal direction of the screen, and an average value $l_{avg}$ of lengths of these line segments for each of these combinations.

Subsequently, in step S910, the viewpoint comparison unit 802 calculates a value of an angle θ' corresponding to each set of viewpoints based on the look-up table acquired in step S909. The angle θ' indicates a smallest angle among twelve angles defined between the respective line segments corresponding to the above-described angles $\theta_1$ to $\theta_6$ and the two straight lines of the unwanted objects.

Subsequently, in step S911, the viewpoint comparison unit 802 compares the angles θ' calculated in step S910 among the respective sets of viewpoints, and selects sets corresponding to a largest angle as the angle θ'.

Subsequently, in step S912, the viewpoint comparison unit 802 selects a set corresponding to a largest value as the length $l_{avg}$ from the sets selected in step S911.

Lastly, in step S913, the usable viewpoint determination unit 803 determines the four viewpoints selected by the viewpoint comparison unit 802 and the single viewpoint used in the live view display, i.e., five viewpoints in total as the viewpoints to be used in image acquisition, and outputs a command signal to the imaging control unit 304. Then, the processing ends. At this time, if the sets of viewpoints are not narrowed down to a single set, the usable viewpoint determination unit 803 performs a process similar to the process described in step S907 to select a single set.

The above is the processing performed when there are only two unwanted objects having straight-line shapes.

If there is an unwanted object having a curved-line shape or there are three or more unwanted objects having straight-line shapes (NO in step S902 or NO in step S908), in step S914, the usable viewpoint determination unit 803 determines all of the viewpoints as the viewpoints to be used in the image acquisition, and outputs a command signal to the imaging control unit 304. Then, the processing ends.

Next, the processing for removing the unwanted object(s) (step S505) will be described in detail.

Figure 11:
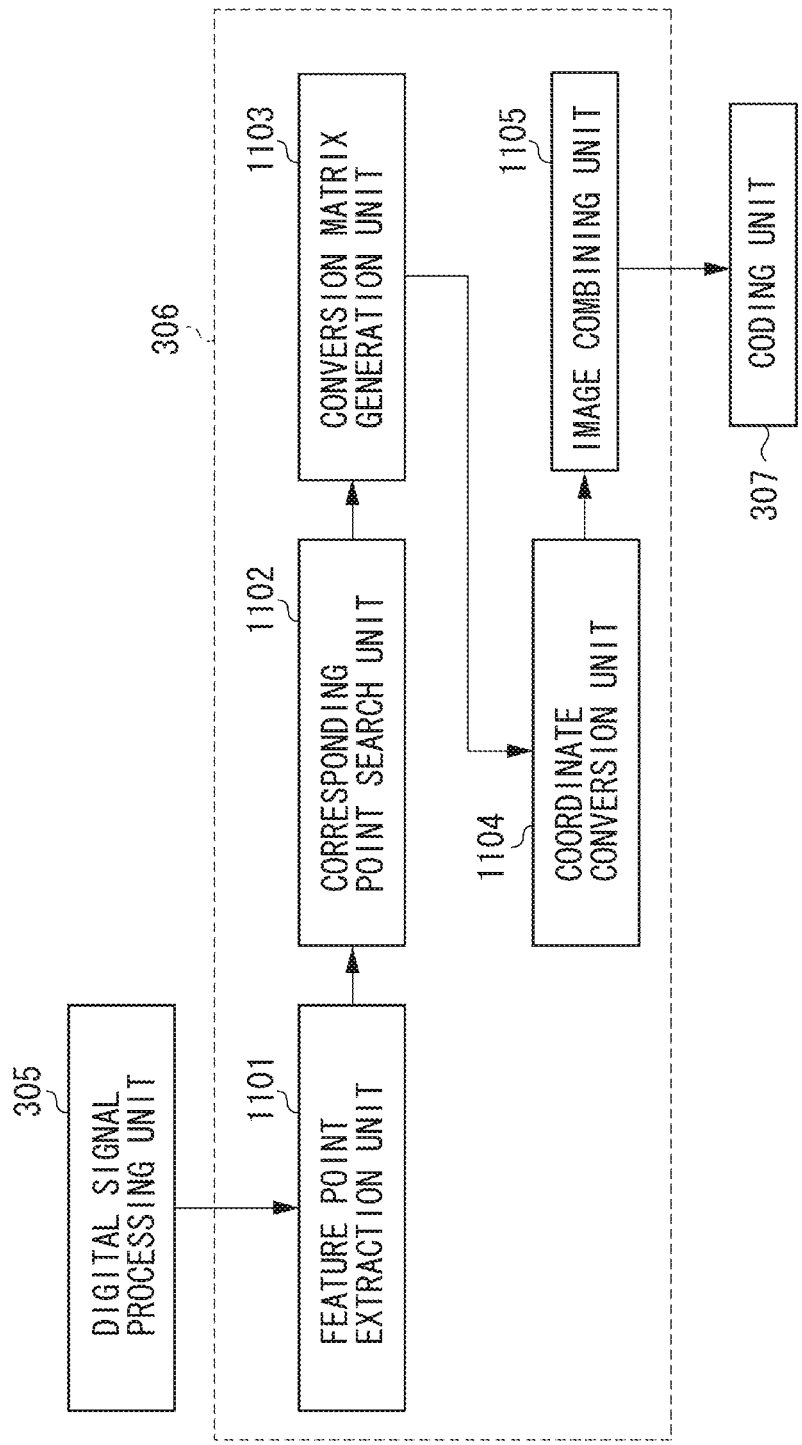
FIG. 11 illustrates a configuration of an unwanted object removal unit according to the first exemplary embodiment.

FIG. 11 is a block diagram illustrating a configuration of the unwanted object removal unit 306. Functions of these respective blocks are also realized by the CPU 401, but a part thereof may be replaced with a dedicated processing circuit(s) or the like.

In the processing for removing the unwanted object(s) according to the present exemplary embodiment, an image with the unwanted object(s) removed therefrom is generated by combining a plurality of images shot from different viewpoints. When the combined image is generated, first, a single image (a reference image) is selected to be used as a reference. A coordinate of each point in images shot from the other viewpoints is converted into a coordinate of a corresponding point in the reference image. Subsequently, an image with the unwanted object(s) removed therefrom is generated by replacing each portion (each occlusion region) where the subject is hidden by each unwanted object in the reference image, with an image of the subject shot from another viewpoint. At this time, the unwanted object(s) do(es) not necessarily have to be removed completely. The unwanted object(s) cannot be removed completely depending on the shooting condition and the size(s) of the unwanted object(s).

Figure 12:
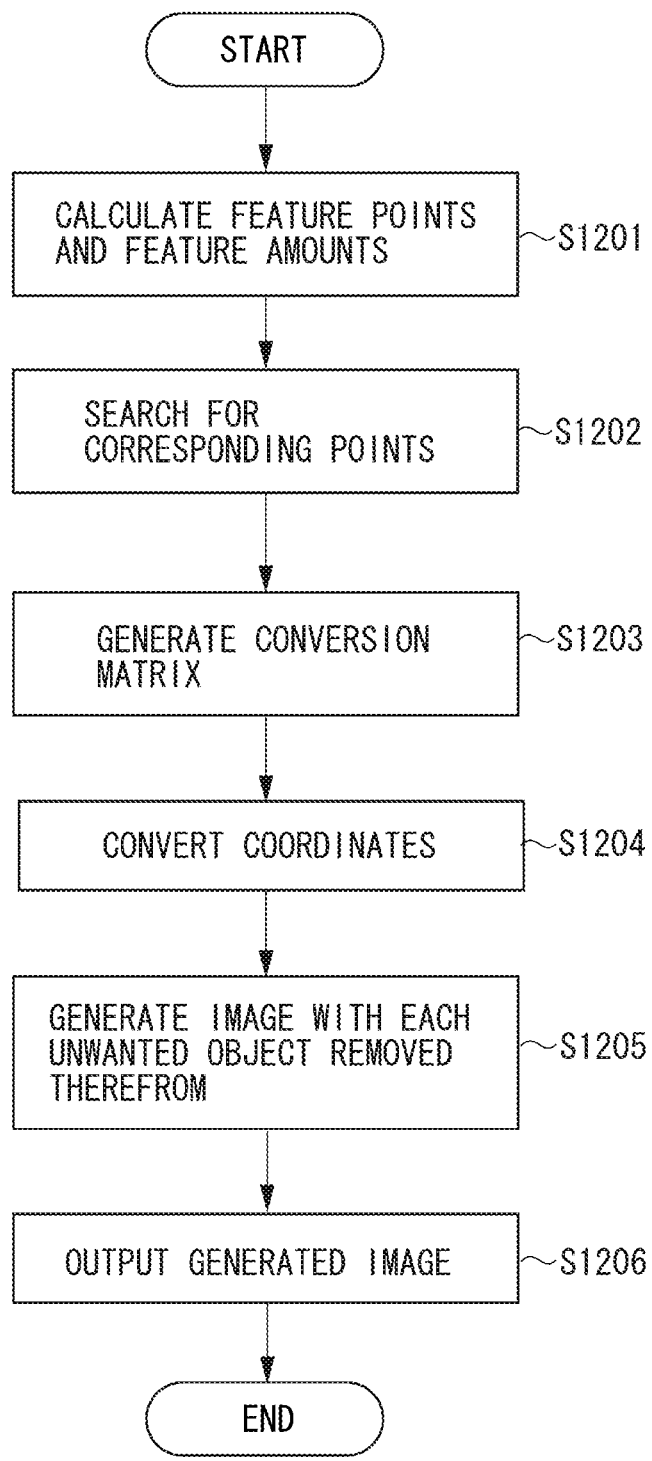
FIG. 12 is a flowchart illustrating processing by the unwanted object removal unit according to the first exemplary embodiment.

In the following description, the processing actually performed by the unwanted object removal unit 306 according to the present exemplary embodiment will be described. FIG. 12 is a flowchart illustrating the processing performed by the unwanted object removal unit 306.

First, in step S1201, a feature point extraction unit 1101 extracts feature points in the plurality of input images, and calculates feature amounts corresponding to the respective feature points. The feature point means a structure in an image, the position of which can be located as a point, such as a vertex of a bright rectangle existing in a dark background. Further, the feature amount means data for distinguishing that feature point from other feature points, which is described with use of an image structure near the feature point. Each feature point is extracted by the Scale Invariant Feature Transform (SIFT) method, which is a commonly and widely used method, and a corresponding feature amount is calculated. The SIFT feature amount is expressed as a multidimensional vector including not only the position of the feature point but also information about an orientation and a scale.

Subsequently, in step S1202, a corresponding point search unit 1102 performs matching on a group of the feature points in the respective images to search for corresponding points between the respective images. The matching processing is performed with use of the feature amounts calculated in step S1201. In the present example, the image acquired from the viewpoint used in the live view display is set as the reference. With respect to each feature point in the image set as the reference, a feature point corresponding to a feature amount having a smallest value as a sum of squared differences is extracted from another image as the corresponding point.

Subsequently, in step S1203, a conversion matrix generation unit 1103 calculates a conversion matrix for converting a coordinate in each image into a coordinate system of the reference image based on the pair of corresponding points acquired by the corresponding point search unit 1102. At this time, because corresponding points acquired from actual image data involve error correspondence, the conversion matrix generation unit 1103 uses a method capable of improving robustness such as Random Sample Consensus (RANSAC).

Subsequently, in step S1204, a coordinate conversion unit 1104 converts each point in each image into the coordinate system of the reference image with use of the conversion matrix calculated in step S1203.

Subsequently, in step S1205, an image combining unit 1105 performs combining processing on each image with its coordinate system converted, to generate an image with the unwanted object(s) removed therefrom. If the image data is acquired from a combination of imaging units in which the slope of the straight line of each unwanted object and the slopes of the line segments connecting the respective viewpoints do not match, a portion where the unwanted object is imaged in one image may be highly likely a point where the subject is imaged in the other two images shot from different viewpoints. Thus, the number of images where the subject is imaged tends to be larger than the number of images where the unwanted object is imaged. Therefore, in the present exemplary embodiment, the unwanted object(s) is(are) removed with use of a vector median filter. The vector median filter is a multidimensional median filter extended from a one-dimensional median filter, and a filter for selecting a vector corresponding to a smallest sum of distances from other vectors. The vector median filter is expressed by the following equation.

$$m = \underset{v \in \{v_1, \ldots v_N\}}{\operatorname{argmin}} \sum_{i=1}^{N} |v - v_i| \qquad \text{[EQUATION 1]}$$

In this equation, m represents a vector median, v represents an input vector that indicates a pixel value of each pixel, and N represents the number of input vectors. As the pixel value, a Red-Green-Blue (RGB) value is treated as the three-dimensional vector v.

Lastly, in step S1206, the image combining unit 1105 outputs the generated image data to the coding unit 307. Then, the processing ends.

According to the above-described configuration, when removing the unwanted object(s) by combining images, the present exemplary embodiment acquires and processes the images after efficiently selecting appropriate viewpoints, and therefore can reduce the information processing amount and the power consumption amount.

The present exemplary embodiment searches for the corresponding points with use of SIFT, but may search for the corresponding points with use of another method such as Speeded Up Robust Features (SURF).

Further, the present exemplary embodiment combines images with use of the vector median filter, but may combine images with use of another method such as calculating a weighted average of pixel values based on differences of the pixel values of the respective points. Further, the present exemplary embodiment selects the viewpoint used in the live view display as the viewpoint for removing the unwanted object regardless of the shapes of the unwanted object(s), but does not necessarily have to select the viewpoint used in the live view display. Further, the number of selected viewpoints to be used is not limited to the above-described number. For example, if there is only a single unwanted object having a straight-line shape, the present exemplary embodiment may select only two viewpoints that do not include the live view viewpoint, as the viewpoints to be used. Further, for example, if there are three unwanted objects having straight-line shapes, the present exemplary embodiment may select seven viewpoints as the viewpoints to be used.

Further, the present exemplary embodiment does not necessarily have to select the image shot from the viewpoint used in the live view display as the reference image for the unwanted object removal processing, and may arbitrarily set the reference image.

Further, the present exemplary embodiment acquires the shape of the unwanted object based on the locus of the touched points on the touch panel. However, the present exemplary embodiment may be configured to allow the user to select the number of unwanted objects and the shape of each unwanted object from a plurality of candidates based on, for example, an operation performed on a button or a dial, thereby acquiring the information.

Further, the present exemplary embodiment acquires images only from the viewpoints to be used in the unwanted object removal processing. However, the present exemplary embodiment may acquire images from all of the viewpoints, and then may perform the unwanted object removal processing with use of only images corresponding to viewpoints selected from them.

Further, the present exemplary embodiment may be configured in such a manner that the information regarding the shape(s) of the unwanted object(s) is input by the user after image data is acquired by imaging.

Further, the present exemplary embodiment selects the viewpoints to be used based on the tables illustrated in FIGS. 10A and 10B. However, the present exemplary embodiment does not necessarily have to use the tables illustrated in FIGS. 10A and 10B, and may select the viewpoints to be used by performing processing with use of another table or a function. For example, the present exemplary embodiment may acquire a set constituted by each of a plurality of unwanted object shapes and optimum viewpoints to be used corresponding thereto in advance, and generate a table that indicates this corresponding relationship. Then, the present exemplary embodiment may select the viewpoints to be used with use of this table.

In the present exemplary embodiment, the unwanted object shape acquisition unit 302 functions as an acquisition unit configured to acquire information regarding a shape of an unwanted object included in a subject.

Further, in the present exemplary embodiment, the viewpoint selection unit 303 functions as a selection unit configured to select a plurality of viewpoint positions from viewpoint positions from which images can be acquired by the imaging, based on the information regarding the shape of the unwanted object.

Further, the unwanted object removal unit 306 functions as a generation unit configured to generate image data in which at least a part of an image of the unwanted object is not included, with use of a plurality of images corresponding to the selected plurality of viewpoint positions.

Further, in the present exemplary embodiment, the viewpoint selection unit 303 functions as a designating unit configured to designate imaging units corresponding to the viewpoint positions selected by the selection unit among a plurality of imaging units, as imaging units to be used in image acquisition by an imaging apparatus.

Further, the operation unit 301 functions as an operation unit configured to input an operation.

Further, the display unit 309 functions as a display unit configured to display an image that includes the image of the unwanted object.

In the first exemplary embodiment, the shape of the unwanted object is acquired based on a user's operation. On the other hand, in a second exemplary embodiment, the shape of the unwanted object is acquired based on image recognition, instead of a user's operation.

Figure 13:
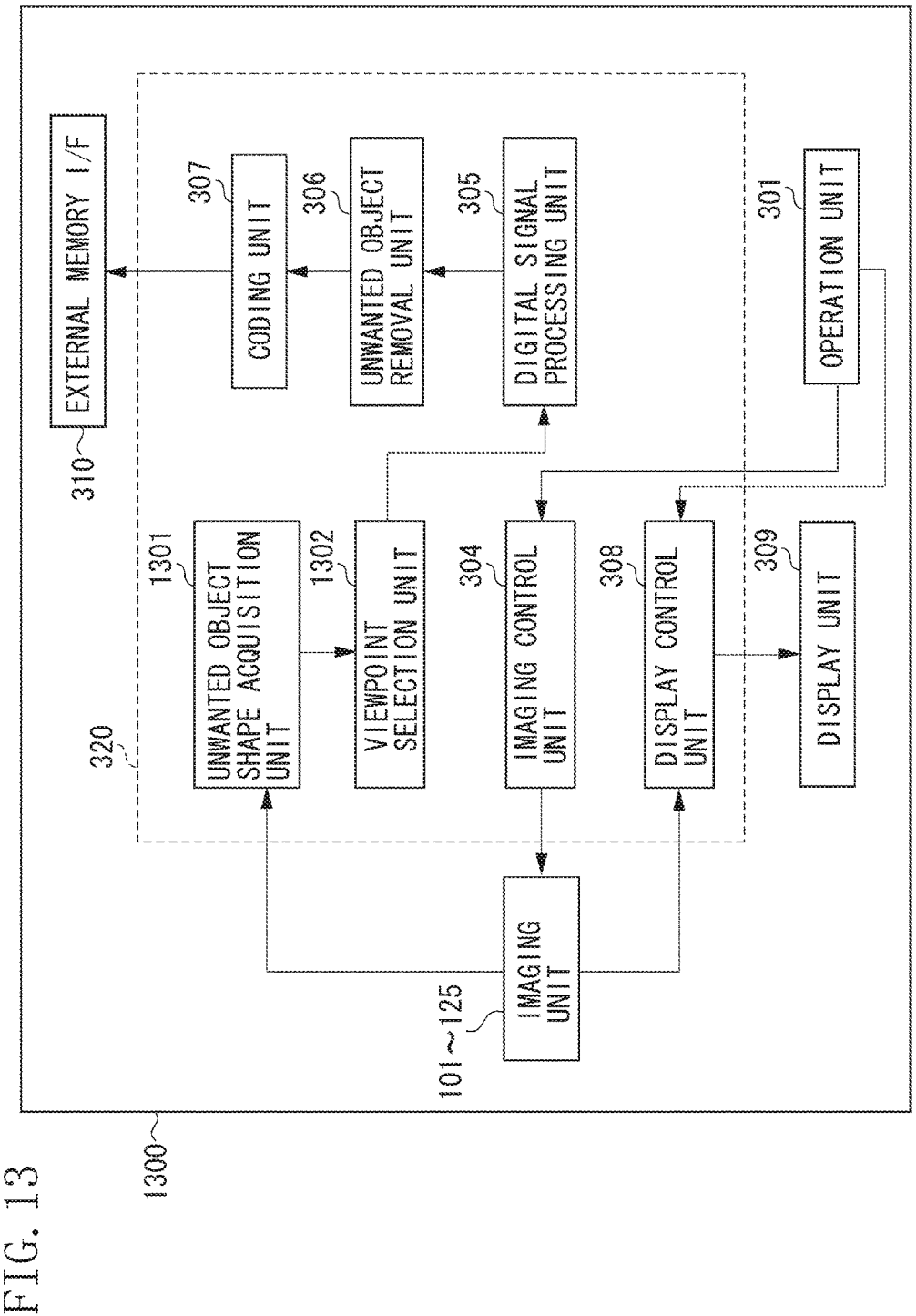
FIG. 13 illustrates a configuration of a camera according to a second exemplary embodiment.

FIG. 13 is a block diagram illustrating a configuration of a camera 1300 according to the second exemplary embodiment. The basic configuration thereof is similar to the camera 100 according to the first exemplary embodiment, but the present exemplary embodiment is different from the first exemplary embodiment in terms of the processing regarding acquisition of a shape of an unwanted object, and a selection of viewpoints to be used. First, the present exemplary embodiment acquires images with use of all of the imaging units 101 to 125, and then acquires a shape of an unwanted object by image recognition. Then, based on a result thereof, the present exemplary embodiment selects images to be used in the unwanted object removal processing.

Figure 14:
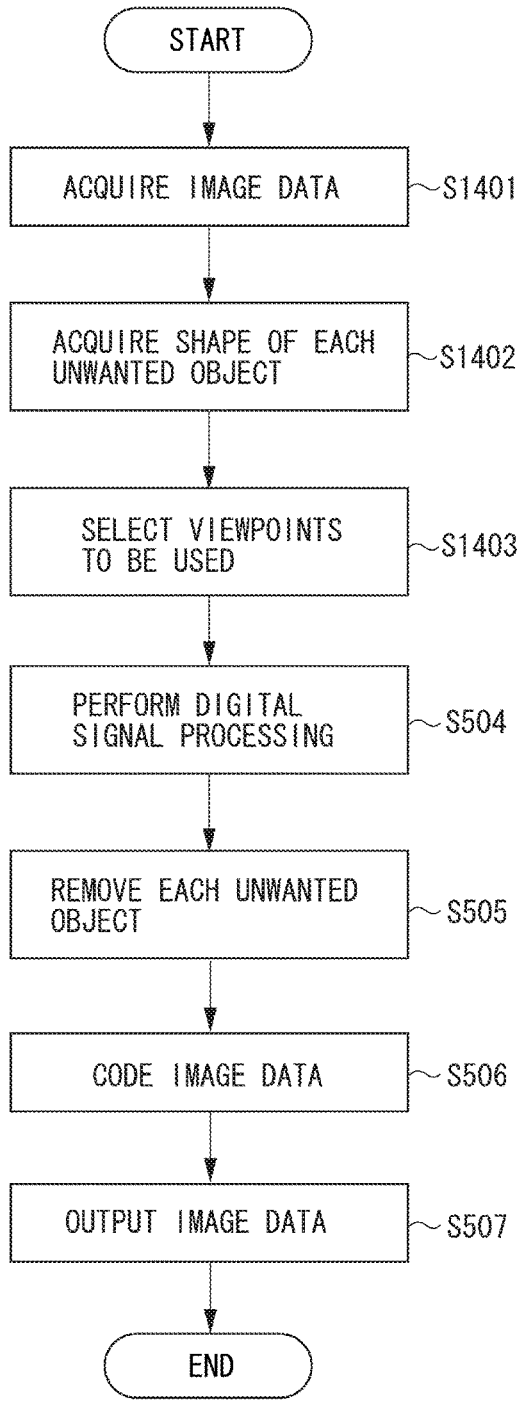
FIG. 14 is a flowchart illustrating processing by the camera according to the second exemplary embodiment.

In the following description, processing performed in the camera 1300 according to the present exemplary embodiment will be described. FIG. 14 is a flowchart illustrating the processing performed in the camera 1300.

First, in step S1401, all of the imaging units 101 to 125 capture images, and output the acquired image data to an unwanted object shape acquisition unit 1301.

Subsequently, in step S1402, the unwanted object shape acquisition unit 1301 acquires a shape of an unwanted object by performing image recognition processing on an image corresponding to a viewpoint used in the live view display, which is included in the acquired image data. At this time, the unwanted object shape acquisition unit 1301 may use any image recognition processing, and in the present exemplary embodiment, the unwanted object shape acquisition unit 1301 detects a straight line by the Hough transform by way of example. Normally, it is difficult to determine which object is an unwanted object in a subject without receiving information from a user. However, an unwanted object removable by combining multi-lens images having a limited parallax among them often has an elongated straight-line shape, and has a constant slope across a wide range in the image. Therefore, this processing allows an unwanted object to be efficiently extracted.

In the detection of a straight line by the Hough transform, first, the unwanted object shape acquisition unit 1301 detects an edge existing in the image data by employing an edge detection operator such as the Sobel filter or the Canny edge detection method on the image set as a target for acquisition of a shape of an unwanted object. The unwanted object shape acquisition unit 1301 binarizes its intensity and generates edge image data having a result of a determination about whether this is an edge or not as a pixel value. Then, the unwanted object shape acquisition unit 1301 performs the Hough transform on the generated edge image data. At this time, coordinates of a point (x, y), which is the edge in the edge image data, are converted into a polar coordinate two-dimensional space established based on an angle $\theta$ defined between an origin and a line perpendicular to a straight line, and a distance $\rho$ from the origin to the straight line, and cells into which the $\rho$–$\theta$ parameter space is divided are put on vote according to the number of edges with respect to each angle $\theta$ and each distance $\rho$. At this time, a combination of the angle $\theta$ and the distance $\rho$ corresponding to the number of edges equal to or larger than a threshold value is used as parameters of the detected straight line. The threshold value is determined based on a ratio to a maximum number of votes. The maximum number of votes may be determined according to an image size, or may be determined according to the number of pixels where edges are detected. In this case, for example, the numbers of pixels on a short side, a long side, and a diagonal line of the image are used as the image size.

Slopes of straight-line patterns in the image are determined based on the detected angles $\theta$. Then, the detected straight-line slopes are put on the vote, and a slope corresponding to a largest number of votes is determined as a slope of an unwanted object. If there are several slopes that show a large number of votes, the unwanted object shape acquisition unit 1301 determines that there are unwanted objects equivalent to the number of these slopes, and acquires these slopes. The present exemplary embodiment may be also configured to allow the user to specify the number of unwanted objects, and acquire slopes of unwanted objects according to the specified number.

Subsequently, in step S1403, a viewpoint selection unit 1302 selects images to be used in the unwanted object removal processing, from the images acquired in step S1401, based on the shape of the unwanted object acquired in step S1402, and outputs the selected images to the digital signal processing unit 305.

After that, the processes of steps S504 to S507 are similar to the first exemplary embodiment, and therefore descriptions thereof will be omitted below.

According to the present exemplary embodiment, it is possible to improve usability of the unwanted object removal processing because the user does not have to perform any operation to designate the shape of the unwanted object.

In the present exemplary embodiment, the unwanted object shape acquisition unit 1301 functions as the acquisition unit configured to acquire the information regarding the shape of the unwanted object included in the subject.

Further, in the present exemplary embodiment, the viewpoint selection unit 1302 functions as the selection unit configured to select the plurality of viewpoint positions from the viewpoint positions from which the images can be acquired, based on the information regarding the shape of the unwanted object.

Further, the unwanted object removal unit 306 functions as the generation unit configured to generate the image data in which at least the part of the image of the unwanted object is not included, with use of the plurality of images corresponding to the selected plurality of viewpoint positions.

Further, in the present exemplary embodiment, the viewpoint selection unit 1302 functions as the designating unit configured to designate the imaging units corresponding to the viewpoint positions selected by the selection unit among the plurality of imaging units, as the imaging units to be used in the image acquisition by the imaging apparatus.

Further, the operation unit 301 functions as the operation unit configured to input the operation.

Further, the display unit 309 functions as the display unit configured to display the image that includes the image of the unwanted object.

In the following description, a third exemplary embodiment will be described. The first exemplary embodiment performs the unwanted object removal processing with use of images shot from all of the viewpoints if there is an unwanted object having a curved-line shape or if there are three or more unwanted objects having straight-line shapes. However, because a large number of procedures are required for the coordinate conversion processing, it is desirable to perform the unwanted object removal processing without use of images shot from all of the viewpoints even in the above-described cases. Therefore, a camera according to the present exemplary embodiment is configured so as to efficiently select the number of viewpoints to be used even when there is an unwanted object having a curved-line shape, by dividing an image into patches as a plurality of small regions, and selecting viewpoints to be used in the unwanted object removal for each patch.

Figure 15:
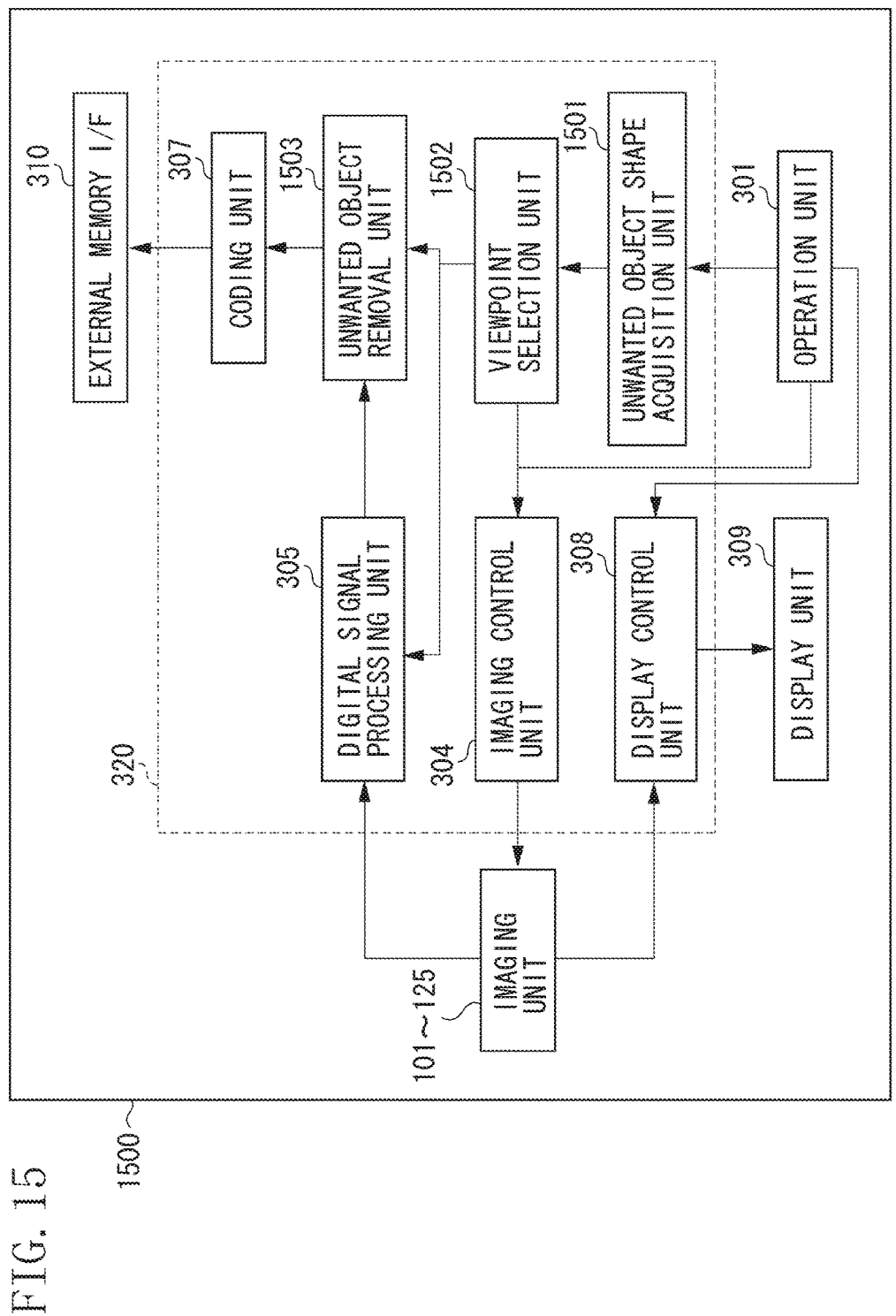
FIG. 15 illustrates a configuration of a camera according to a third exemplary embodiment.

FIG. 15 is a block diagram illustrating a camera 1500 according to the present exemplary embodiment. A basic configuration of the camera 1500 according to the present exemplary embodiment is similar to the camera 100 according to the first exemplary embodiment, but is different from the first exemplary embodiment in terms of processing performed by an unwanted object shape acquisition unit 1501, a viewpoint selection unit 1502, and an unwanted object removal unit 1503.

Figure 16:
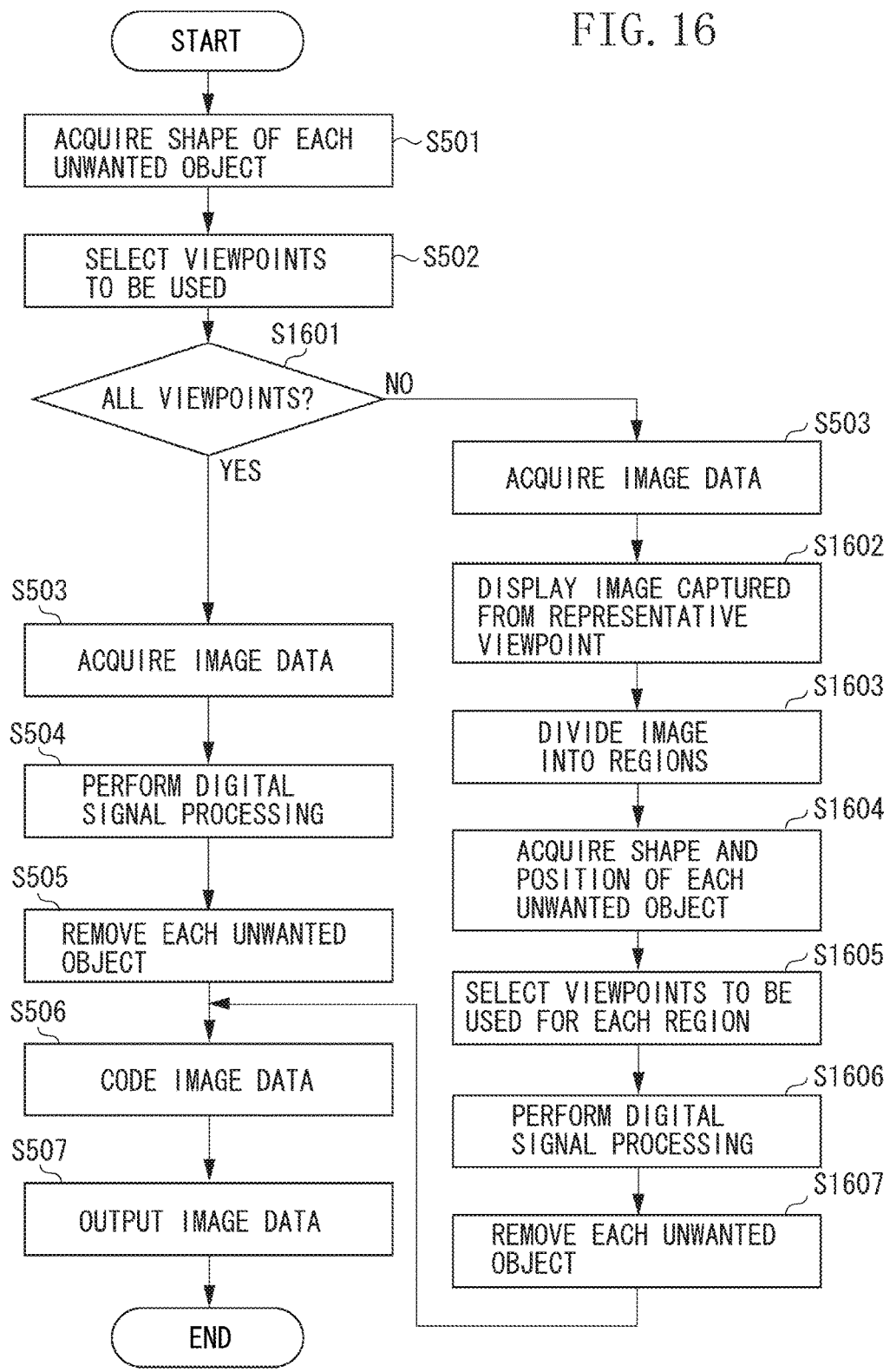
FIG. 16 is a flowchart illustrating processing by the camera according to the third exemplary embodiment.

In the following description, processing performed in the camera 1500 will be described. FIG. 16 is a flowchart illustrating the processing performed in the camera 1500.

First, steps S501 and S502 are performed in a similar manner to the first exemplary embodiment. However, in the present exemplary embodiment, processes thereafter are different.

After the viewpoints are selected by the viewpoint selection unit 1502, in step S1601, the viewpoint selection unit 1502 determines whether the selected viewpoints to be used are all of the viewpoints. When all of the viewpoints are selected, there are three or more unwanted objects having straight-line shapes, or that there is an unwanted object having a curved-line shape. If not all of the viewpoints are selected (NO in step S1601), image data is acquired with use of the selected viewpoints, and the processes of step S503 and the steps thereafter are performed in a similar manner to the first exemplary embodiment. Then, the processing ends.

If the viewpoints selected to be used are all of the viewpoints (YES in step S1601), the viewpoint selection unit 1502 reselects viewpoints to be used. First, in step S503, the digital signal processing unit 305 obtains image data acquired by the imaging units 101 to 125 corresponding to all of the viewpoints as instructed originally.

Subsequently, in step S1602, the display unit 309 displays an image acquired by imaging the subject from the viewpoint used in the live view display, among the acquired images corresponding to the plurality of viewpoints.

Because the position of the camera 1500 may be displaced between before the image is captured and after the image is captured, the user performs a touch operation like tracking the image displayed here, thereby designating the shape and the position of the unwanted object again. Alternatively, the present exemplary embodiment may be configured to omit this step, assuming that a change in the position of the camera 1500 between before and after the image acquisition is negligibly small and perform subsequent processes with use of the coordinates of the touched positions acquired in step S501.

Figure 17:
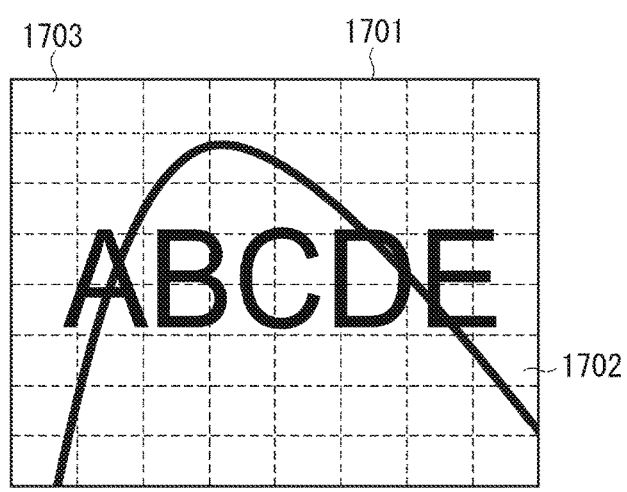
FIG. 17 illustrates how an image region is divided according to the third exemplary embodiment.

Subsequently, in step S1603, the unwanted object shape acquisition unit 302 divides the image region displayed on the display unit 309 into patches as a plurality of small regions, as illustrated in FIG. 17. An image 1701 is the image displayed on the display unit 309, and a curved line 1702 is a curved line that indicates the unwanted object in the image 1701. Further, a region 1703 is one of the patches acquired by dividing the image 1701. The patch here means a small region that includes a plurality of pixels, and the respective patches are disposed so as to overlap each other. The divided regions may be or may not be displayed on the display unit 309. In the present exemplary embodiment, the image region is divided into 8×8 patches, i.e., sixty-four patches. The number of divided patches is not limited thereto, and may be any number as long as it is sufficient to perform the straight-line approximation. Further, the shape of each patch is also not limited to the rectangular shape, and a triangular shape or the like may also be used. Further, the present exemplary embodiment may be configured to change the number of patches according to complexity of the shape detected in step S502.

Subsequently, in step S1604, the unwanted object shape acquisition unit 1501 acquires the shape and the position of the unwanted object with use of touched point information newly acquired based on the user's operation. In the present case, the unwanted object shape acquisition unit 1501 acquires a slope by the straight-line approximation for each of the regions divided in step S1603. The unwanted object shape acquisition unit 1501 outputs information that indicates the thus-acquired slope and the region corresponding to this slope to the viewpoint selection unit 1502.

Subsequently, in step S1605, the viewpoint selection unit 1502 selects viewpoints to be used for each region by a method similar to step S502 based on the information that indicates the shape of the unwanted object for each region, which is acquired in step S1604. Information regarding the viewpoints to be used, which is acquired for each region in this step, is output to the digital signal processing unit 305 and the unwanted object removal unit 306, respectively.

Subsequently, in step S1606, the digital signal processing unit 305 performs the digital signal processing only on image data corresponding to viewpoints included in the viewpoints to be used, which are selected in step S1605, among the image data pieces acquired in step S503. The processed image data is output to the unwanted object removal unit 1503.

Subsequently, in step S1607, the unwanted object removal unit 1503 performs the unwanted object removal processing with use of the image data input from the digital signal processing unit 305, and outputs the generated image data to the coding unit 307. In this case, the unwanted object removal unit 1503 removes the unwanted object with use of the vector median filter for each patch, and acquires final image data by combining the respective patches with the unwanted object removed therefrom. When combining the patches, the unwanted object removal unit 1503 may deal with a region where the patches overlap each other, by calculating an average of pixel values and using the calculated average as the pixel value of that pixel, or deal with the region by using a median calculated with use of the vector median filter, as the pixel value of that pixel.

After that, the processes of steps S506 and S507 are performed. Then, the processing ends.

According to the present exemplary embodiment, it is possible to efficiently select the viewpoints to be used in the unwanted object removal processing, which reduces the processing amount of the unwanted object removal processing, even when the subject includes an unwanted object having a complicated shape such as a curved-line shape.

In the present exemplary embodiment, the unwanted object shape acquisition unit 1501 functions as the acquisition unit configured to acquire the information regarding the shape of the unwanted object included in the subject.

Further, in the present exemplary embodiment, the viewpoint selection unit 1502 functions as the selection unit configured to select the plurality of viewpoint positions from the viewpoint positions from which the images can be acquired, based on the information regarding the shape of the unwanted object.

Further, the unwanted object removal unit 1503 functions as the generation unit configured to generate the image data in which at least the part of the image of the unwanted object is not included with use of the plurality of images corresponding to the selected plurality of viewpoint positions.

Further, in the present exemplary embodiment, the viewpoint selection unit 1502 functions as the designating unit configured to designate the imaging units corresponding to the viewpoint positions selected by the selection unit among the plurality of imaging units, as the imaging units to be used in the image acquisition by the imaging apparatus.

Further, the operation unit 301 functions as the operation unit configured to input the operation.

Further, the display unit 309 functions as the display unit configured to display the image that includes the image of the unwanted object.

In the following description, a fourth exemplary embodiment will be described. When an unwanted object is removed with use of the first exemplary embodiment without any modification made thereto, an image of the unwanted object may not be completely removed even by performing the unwanted object removal processing with use of the images shot from all of the viewpoints. This phenomenon occurs, for example, when a lattice-shaped unwanted object is included in an image, an angle of each straight line which forms this lattice matches an angle of a symmetry axis of a layout of the respective viewpoints included in the array camera, and the array camera has only a small number of viewpoints. This is due to the presence of the points hidden by the unwanted object as viewed from more than a half of viewpoints under the above-described conditions, even when all of the viewpoints are used. FIG. 18A illustrates this example. FIG. 18A illustrates images formed by a scene that includes a lattice-shaped unwanted object extending in horizontal and vertical directions from 3×3 viewpoints arranged at even intervals in the horizontal and vertical directions. Images 1801 to 1809 are images captured from an upper left viewpoint, an upper central viewpoint, an upper right viewpoint, a central left viewpoint, a central viewpoint, a central right viewpoint, a lower left viewpoint, a lower central viewpoint, and a lower right viewpoint in this order, respectively. The alphabets ABCDE in the images indicate a target subject, and straight lines intersecting with each other indicate the lattice-shaped unwanted object existing in front of the target subject. Because the images 1801 to 1809 are captured from viewpoints different from one another, they have a parallax among them. The unwanted object is located closer to the camera that has shot the images compared to the target subject, whereby a group of images in which images of the unwanted object are out of alignment with one another can be acquired when positioning the respective images based on the target subject. The unwanted object is removed by utilizing this misalignment among the images of the unwanted object in the unwanted object removal processing with use of the multi-lens images. However, when the direction of the image of the unwanted object matches the symmetry axis of the layout of the viewpoints, as shown in the example illustrated in FIG. 18A, the deviation of the image of the unwanted object among the respective images is eliminated. Therefore, even application of the vector median filter on such a group of images results in a failure to remove the image of the unwanted object with some points left as is, like an image 1810.

Figure 18B:
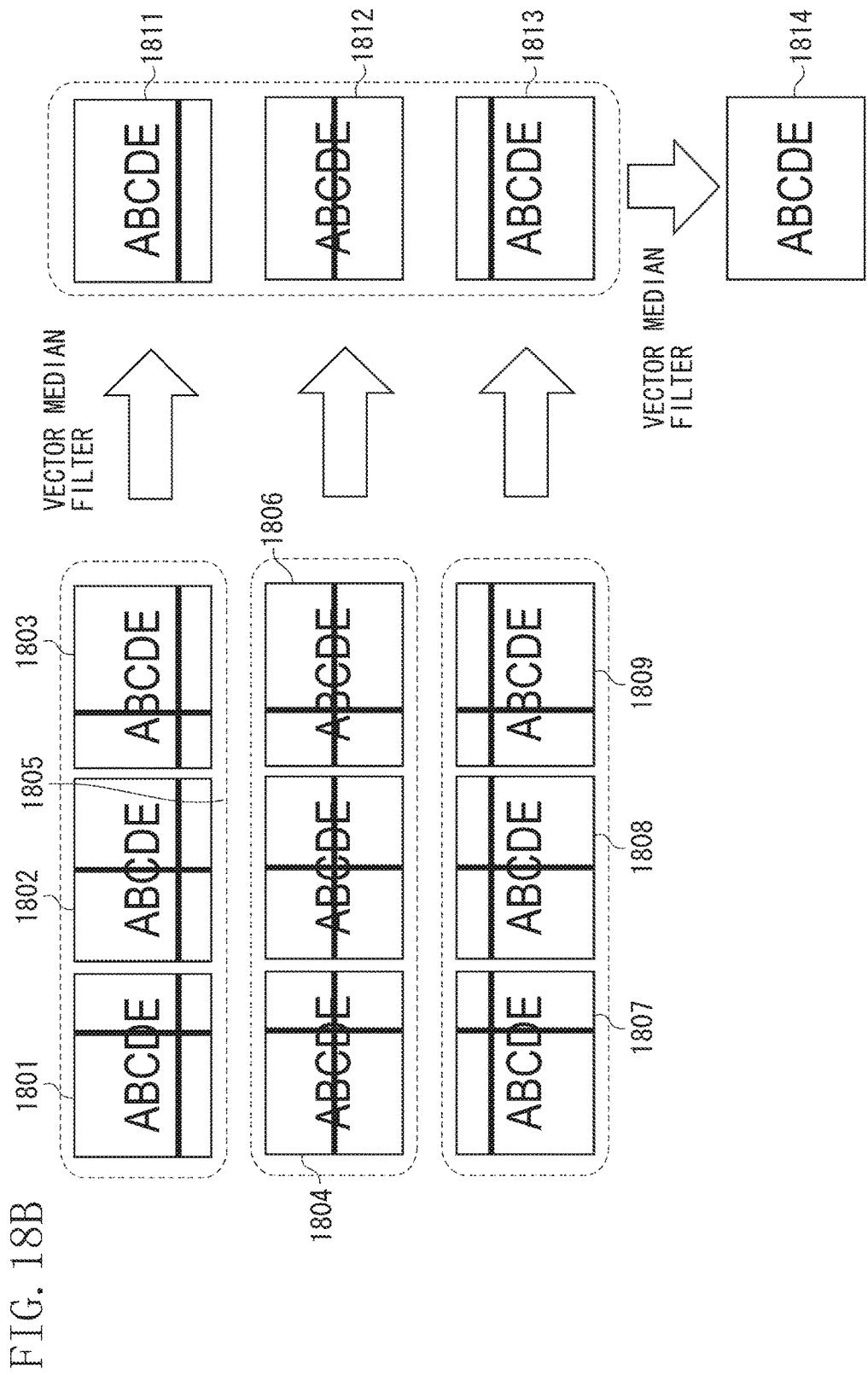

Therefore, the present exemplary embodiment will be described as a method that realizes the removal of an unwanted object even in such a case. More specifically, the present exemplary embodiment removes an image of an unwanted object by further performing the processing with use of the vector median filter on a plurality of images from which a part of the unwanted object has been removed by performing the unwanted object removal with use of the vector median filter. An overview thereof will be described now with reference to FIG. 18B. When the images illustrated in FIG. 18A are acquired, first, the present exemplary embodiment acquires an image with a part of the image of the unwanted object removed therefrom with use of a part of the acquired image group. In the example illustrated in FIG. 18B, the present exemplary embodiment performs the vector median filter processing on the images 1801 to 1803 arranged in the horizontal direction to acquire an image 1811 from which an image of the unwanted object in the vertical direction is removed. Similarly, the present exemplary embodiment acquires an image 1812 with use of the images 1804 to 1806, and acquires an image 1813 with use of the images 1807 to 1809. Each of the images 1811 to 1813 includes only an image of the unwanted object as a single line, and they are images in which the images of the unwanted object are out of alignment with one another. Therefore, the present exemplary embodiment can acquire an image 1814 with the image of the unwanted object removed therefrom by performing the vector median filter processing again with use of the images 1811 to 1813. This is the overview of the processing performed by the present exemplary embodiment. In the following description, a specific configuration of the present exemplary embodiment will be described.

Figure 19:
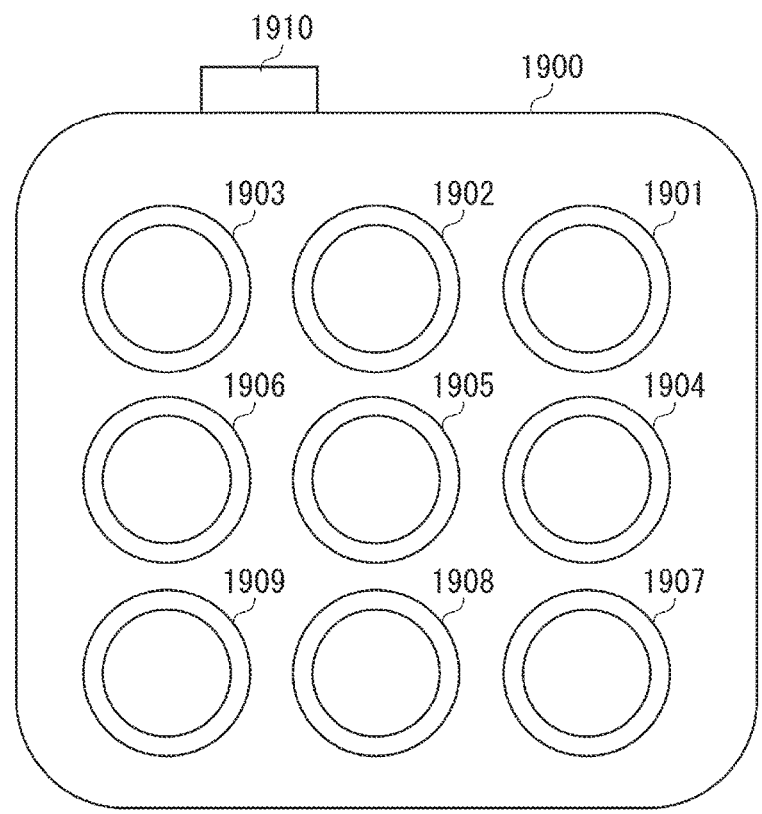
FIG. 19 illustrates an outer appearance of a camera according to the fourth exemplary embodiment.
Figure 20:
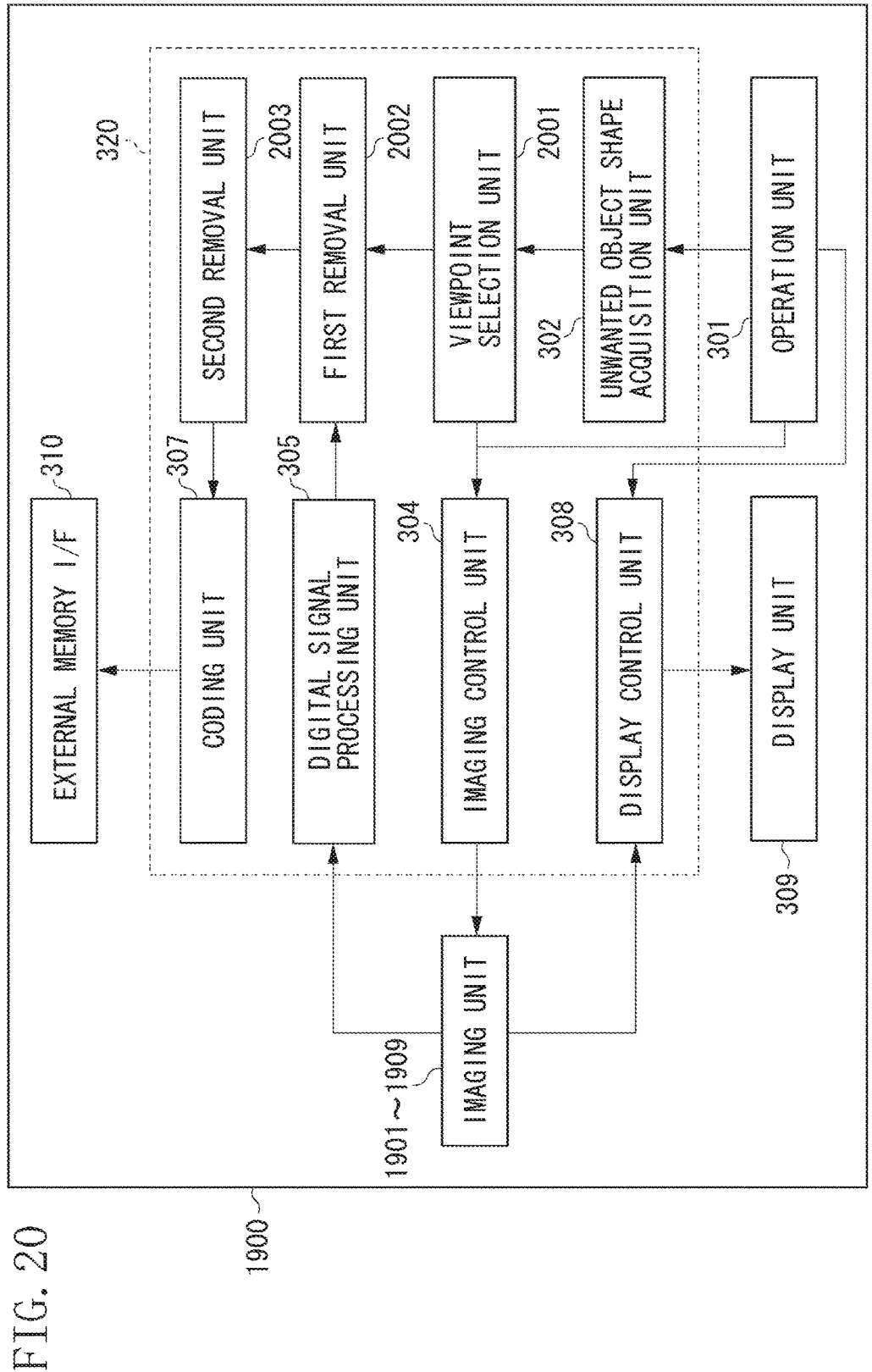
FIG. 20 illustrates a configuration of the camera according to the fourth exemplary embodiment.

FIG. 19 illustrates an array camera 1900 (hereinafter referred to as a camera 1900) according to the present exemplary embodiment. The camera 1900 includes nine imaging units 1901 to 1909 each configured to acquire a color image, and a shooting button 1910. The imaging units 1901 to 1909 are arranged in a lattice manner, forming a 3×3 layout. The number and layout of the imaging units is not limited to this example, and the camera 1900 may be any imaging apparatus as long as it includes a plurality of imaging units. FIG. 20 is a block diagram illustrating a configuration of the camera 1900 according to the present exemplary embodiment. The basic configuration of the camera 1900 is similar to the camera 100 according to the first exemplary embodiment, but in the camera 1900, the viewpoint selection unit 303 is replaced with a viewpoint selection unit 2001, and the unwanted object removal unit 306 is replaced with a first removal unit 2002 and a second removal unit 2003.

Figure 21:
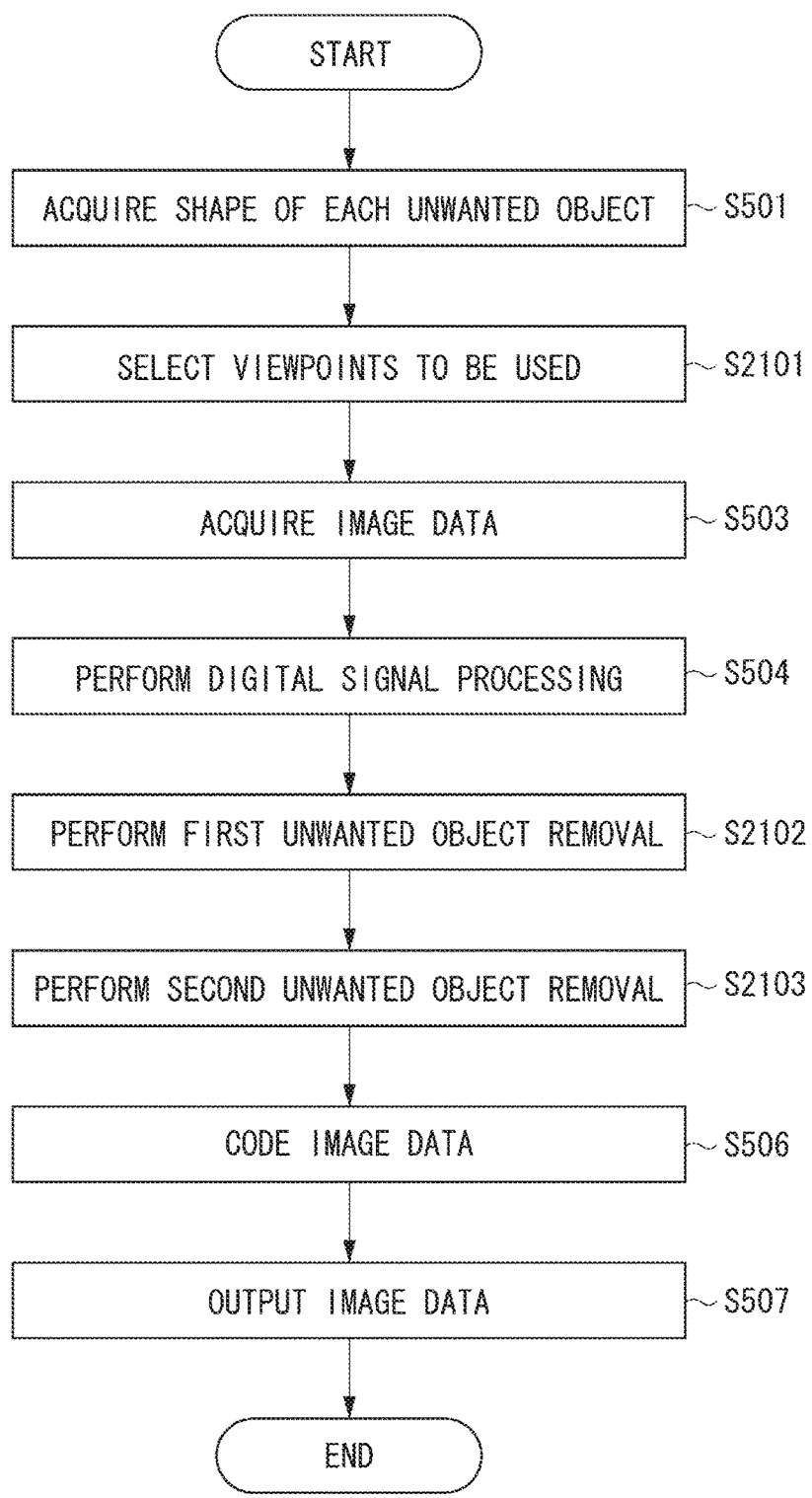
FIG. 21 is a flowchart illustrating processing by the camera according to the fourth exemplary embodiment.

In the following description, processing performed in the camera 1900 will be described. FIG. 21 is a flowchart illustrating a flow of the processing performed in the camera 1900 according to the present exemplary embodiment. Similar processes to the first exemplary embodiment will be identified by the same step numbers as those illustrated in FIG. 5, and descriptions thereof will be omitted. In step S2101, the viewpoint selection unit 2001 selects viewpoints to be used in a removal of an unwanted object acquired in step S501. In this case, the viewpoint selection unit 2001 selects viewpoint groups (viewpoint position groups) to be used in first unwanted object removal processing (hereinafter referred to as a first removal), and outputs a result thereof to the first removal unit 2002. This processing will be described in detail below.

In step S2102, the first removal unit 2002 performs the first removal based on information that indicates the viewpoint groups to be used in the first removal, which is output from the viewpoint selection unit 2001. The first removal will be described now with reference to the example illustrated in FIG. 18B. Information that indicates a viewpoint group A corresponding to the images 1801 to 1803, a viewpoint group B corresponding to the images 1804 to 1806, and a viewpoint group C corresponding to the images 1807 to 1809 is input from the viewpoint selection unit 2001. Then, the first removal unit 2002 extracts a group of image data pieces belonging to each viewpoint group from the image data pieces input from the digital signal processing unit 305, and performs the unwanted object removal processing with use of the vector median filter among the image data pieces belonging to a same viewpoint group. In the example illustrated in FIG. 18B, the image data 1811 corresponding to the viewpoint group A, the image data 1812 corresponding to the viewpoint group B, and the image data 1813 corresponding to the viewpoint group C are generated by this unwanted object removal processing. The first removal unit 2002 outputs the image data (first image data) generated at this time to the second removal unit 2003. Then, the processing proceeds to step S2103.

In step S2103, the second removal unit 2003 performs the unwanted object removal processing by the vector median filter again with use of the image data group obtained after the first removal processing, which is output from the first removal unit 2002. This is referred to as second unwanted object removal processing (a second removal). The second removal unit 2003 outputs image data (second image data) generated as a result of the second removal to the coding unit 307, and then the processes of steps S506 and S507 are performed. If only one viewpoint group is selected by the viewpoint selection unit 2001, and only a single image data piece is output from the first removal unit 2002, this image data piece is output to the coding unit 307 without performing the second removal.

Figure 22:
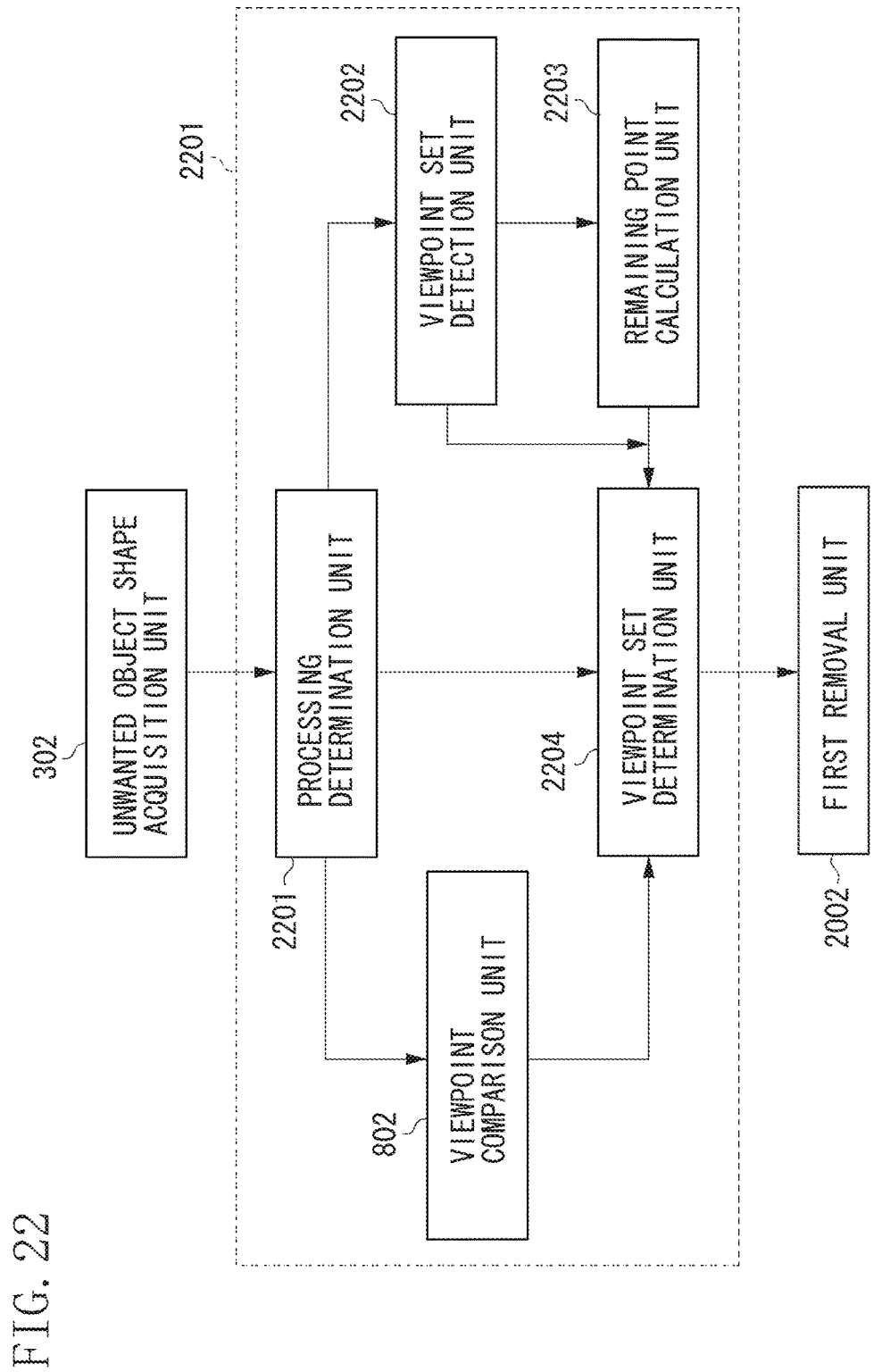
FIG. 22 illustrates a configuration of a viewpoint selection unit according to the fourth exemplary embodiment.
Figure 23:
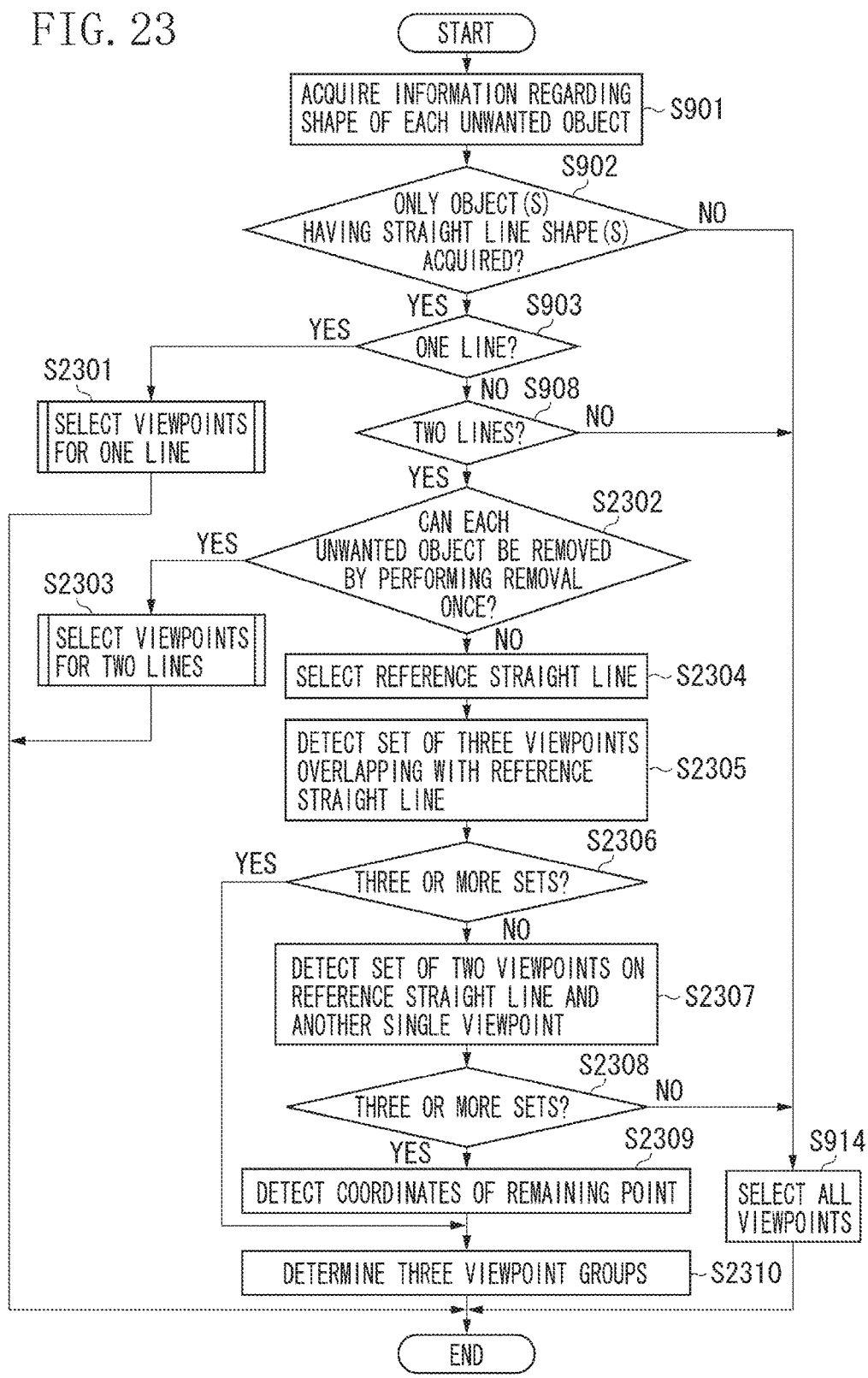
FIG. 23 is a flowchart illustrating processing by the viewpoint selection unit according to the fourth exemplary embodiment.

This is the overview of the processing performed in the camera 1900 according to the present exemplary embodiment. Next, the processing (step S2101) performed by the viewpoint selection unit 2001 according to the present exemplary embodiment will be described in detail with reference to a block diagram of the viewpoint selection unit 2001 illustrated in FIG. 22 and a flowchart illustrated in FIG. 23. Processes similar to the first exemplary embodiment will be identified by the same reference numerals as those illustrated in the flowchart of FIG. 9, and descriptions thereof will be omitted below. Steps S2301 and S2303 are processes corresponding to steps S904 to S907 and steps S909 to S913 according to the first exemplary embodiment, respectively. The processes performed in these steps are basically similar to the first exemplary embodiment except for a process corresponding to step S907 and a process corresponding to step S913, in which a viewpoint set determination unit 2204 outputs selected three or five viewpoints to the first removal unit 2002 as a single group of viewpoints.

If a processing determination unit 2201 determines in step S908 that the image of the unwanted object as a removal target has two straight-line shapes (YES in step S908), in step S2302, the processing determination unit 2201 determines whether the image of the unwanted object can be removed by performing the vector median filter processing once with use of images shot from all of the viewpoints. This determination is made by the following method. First, the processing determination unit 2201 plots points corresponding to the respective viewpoints owned by the camera 1900 on a two-dimensional plane based on relative coordinates of the respective viewpoints owned by the camera 1900. Then, upon plotting straight lines having the same slopes as the image of the unwanted object on this plane, the processing determination unit 2201 places respective straight lines having the same slopes as the image of the unwanted object at positions where a largest number of points overlap the plotted straight lines among the points corresponding to the respective viewpoints. At this time, if the number of viewpoints overlapping the straight lines is more than a half of the number of viewpoints owned by the camera 1900, even if the vector median filter processing is executed with use of images shot from all of the viewpoints, a point is generated where the image of the unwanted object remains. In other words, the processing determination unit 2201 determines that the image of the unwanted object cannot be removed by performing the median filter processing once (NO in step S2302). At this time, in consideration of the width of the unwanted object, the processing determination unit 2201 may plot each straight line on the two-dimensional place in such a manner that the plotted straight line has a certain width, and/or may plot the point corresponding to each viewpoint as a region occupying a certain region. If the processing determination unit 2201 determines that the image of the unwanted object can be removed by performing the vector median filter processing once (YES in step S2302), the processing proceeds to step S2303. If the processing determination unit 2201 determines that the image of the unwanted object cannot be removed by performing the vector median filter processing once (NO in step S2302), the processing determination unit 2201 outputs the unwanted object shape information to a viewpoint set detection unit 2202. Then, the processing proceeds to step S2304.

If the processing determination unit 2201 determines that the image of the unwanted object cannot be removed by performing the vector median filter processing once (NO in step S2302), in step S2304, the viewpoint set detection unit 2202 selects a reference straight line to be used as a reference for detection of viewpoint groups based on the unwanted object shape information input from the processing determination unit 2201. Any of the two straight lines corresponding to the unwanted object may be selected as the reference straight line, but a success rate in removing the unwanted object can be increased by selecting a straight line having a larger angle relative to an axis along which a largest number of viewpoints are lined up in the camera 1900. The present exemplary embodiment may be configured in such a manner that, if processing that will be described below is performed with use of the selected reference straight line but this processing fails in removing the unwanted object, the processing that will be described below is performed again with another straight line newly selected as the reference straight line.

Subsequently, in step S2305, the viewpoint set detection unit 2202 searches for viewpoints overlapping the reference straight line while changing the position of the reference straight line on the two-dimensional plane set in step S2302. Then, if there are three or more viewpoints overlapping the reference straight line at a certain straight line position, the viewpoint set detection unit 2202 selects three viewpoints from them, and detects them as one group of viewpoints corresponding to this straight line position. The viewpoint set detection unit 2202 selects viewpoints in such a manner that respective groups of viewpoints detected at this time as sets respectively correspond to straight line positions different from one another. Subsequently, in step S2306, the viewpoint set detection unit 2202 determines whether there are three or more sets as the viewpoint groups respectively corresponding to straight line positions different from one another, which are detected in step S2305. If the viewpoint set detection unit 2202 determines that there are three or more sets as the detected viewpoint groups (YES in step S2306), the processing proceeds to step S2310. If the number of detected viewpoint groups is smaller than three (NO in step S2306), the processing proceeds to step S2307.

Subsequently, in step S2307, the viewpoint set detection unit 2202 detects a set constituted by two viewpoints overlapping the reference straight line at a certain straight line position and another single viewpoint while changing the position of the reference straight line on the same two-dimensional plane as step S2305. The viewpoint group detected at this time is detected as a viewpoint group corresponding to the position of the reference straight line when this viewpoint set is detected. The other single viewpoint detected at this time should be a viewpoint that is not in a positional relationship causing the viewpoint to be aligned with any of the two viewpoints detected at the same time along the straight line of the unwanted object that is not the reference straight line. The reason therefor will be described based on an example in which the unwanted object as the removal target is a lattice constituted by straight lines having two types of slopes, i.e., a straight line horizontally extending and a straight line vertically extending in front of the camera 1900. At this time, if the viewpoint 1804 is selected as the additional single viewpoint in addition to the viewpoints 1807 and 1808 that exist on the horizontal straight line as the viewpoints to be used in the unwanted object removal, the horizontal image of the unwanted object cannot be removed because it exists at a same position in the images shot from the viewpoints 1807 and 1808. Further, similarly, the vertical image of the unwanted object cannot be removed, too, because it exists at a same position in the images shot from the viewpoints 1804 and 1807. In other words, the image of the unwanted object cannot be removed with the above-described combination of viewpoints at all, whereby the viewpoint set detection unit 2202 avoids selecting such a set of viewpoints at this time.

Subsequently, in step S2308, the viewpoint set detection unit 2202 determines whether the number of viewpoint groups corresponding to different straight line positions detected in steps S2305 and S2307 reaches or exceeds three. If the viewpoint set detection unit 2202 determines that the number of viewpoint groups corresponding to different straight line positions reaches or exceeds three (YES in step S2308), the viewpoint set detection unit 2202 outputs information that indicates the detected viewpoint groups, to a remaining point calculation unit 2203. Then, the processing proceeds to step S2309. If the number of viewpoint groups corresponding to difference straight line positions is smaller than three even after the execution of step S2307 (NO in step S2308), it is determined that it is difficult to completely remove the image of the unwanted object by the two steps of the vector median filter processing. Then, the processing proceeds to step S914. In step S914, the viewpoint set determination unit 2204 determines all of the imageable viewpoints as a single viewpoint group to be used in the unwanted object removal, and outputs them to the first removal unit 2002.

Figure 24A:
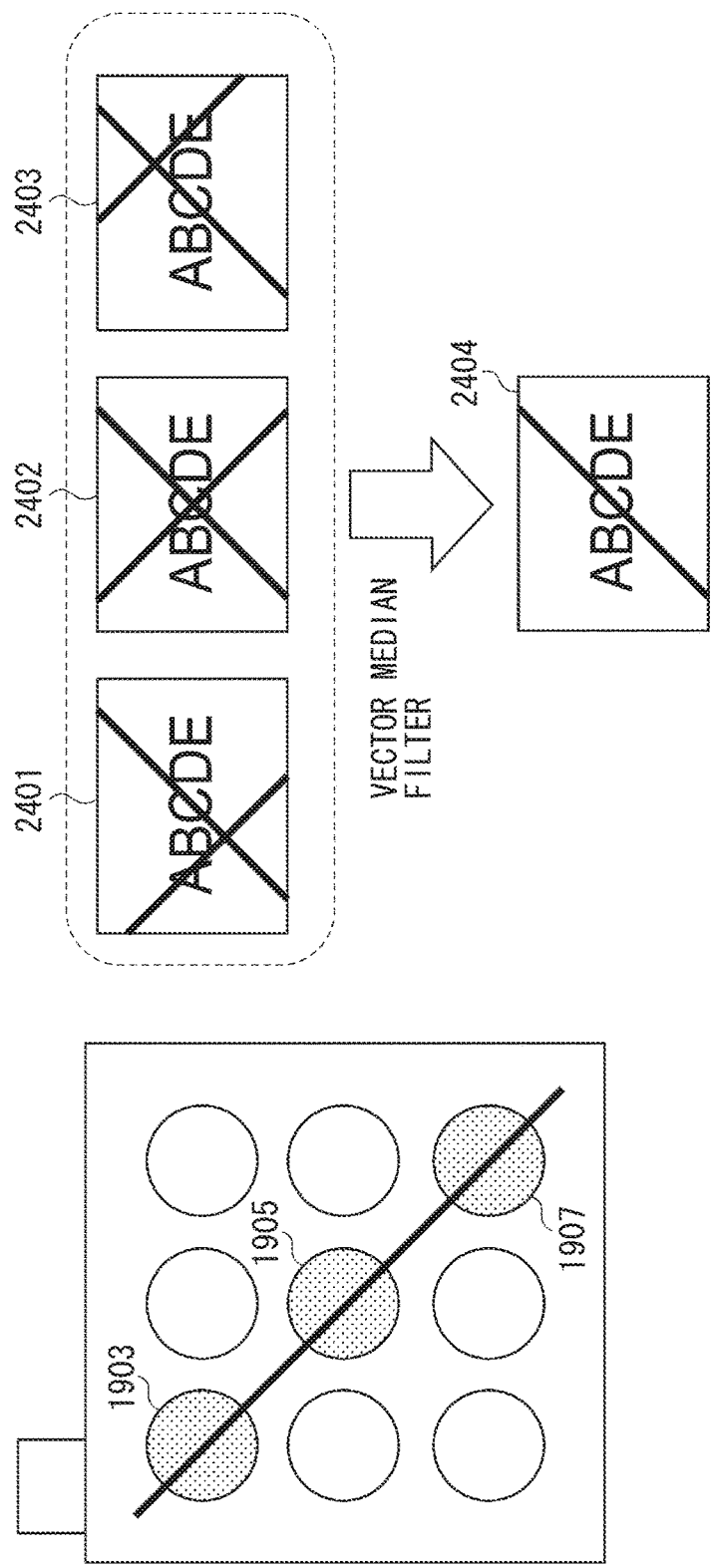

Subsequently, in step S2309, the remaining point calculation unit 2203 calculates a point (a remaining point) at which the image of the unwanted object remains without being removed after execution of the first unwanted object removal processing with use of each of the viewpoint groups output from the viewpoint set detection unit 2202. The point at which the image of the unwanted object remains without being removed will be described with reference to FIGS. 24A and 24B. The example illustrated in FIGS. 24A and 24B will be described, assuming that there is a lattice constituted by straight lines respectively inclined at an angle of 45 degrees relative to the horizontal direction and perpendicular to each other as the unwanted object, and the straight line inclined at an angle of 45 degrees to the right relative to the vertical direction as viewed from a person shooting the subject is set to be the reference straight line. FIG. 24A illustrates an example when the vector median filter processing is performed with use of a set of three viewpoints overlapping the reference straight line. Imaging units 1903, 1905, and 1907 of the camera 1900 are selected as the viewpoints to be used in the first removal. An image 2401 is an image captured by the imaging unit 1907. An image 2402 is an image captured by the imaging unit 1905. An image 2403 is an image captured by the imaging unit 1903. The reference straight line is located at a same position in all of the images 2401 to 2403. However, a parallax is generated among the images 2401 to 2403 for the other straight line, whereby an image 2404 after the first removal is generated as an image where only the image of the reference straight line remains as the unwanted object. FIG. 24B illustrates an example when the vector median filter processing is performed with use of a viewpoint group constituted by two viewpoints overlapping the reference straight line and another single viewpoint. Imaging units 1901, 1906, and 1908 of the camera 1900 are selected as the viewpoints to be used in the first removal. An image 2411 is an image captured by the imaging unit 1901. An image 2412 is an image captured by the imaging unit 1906. An image 2413 is an image captured by the imaging unit 1908. The reference straight line is located at a same position in the images 2412 and 2413, but is located at a different position in the image 2411. The straight line that is not the reference straight line has a parallax among all of the three images. In an image acquired from such a combination of viewpoints, intersection points between the image of the reference straight line in the image 2411 and the images of the straight line that is not the reference straight line in the images 2412 and 2413 remain without being removed, in addition to the image of the reference straight line in the images 2412 and 2413.

Next, a method for calculating the point at which the unwanted object remains will be described. For simplification of the method, the point at which the unwanted object remains is calculated in a coordinate system that is established based on a different scale from positions on the actual image and indicates a positional relationship among the respective viewpoints and a positional relationship between the straight lines of the unwanted object. For example, this calculation can be made with use of the coordinate system used in step S2302, or the like. Even in this coordinate system, the positional relationship of the point at which the unwanted object remains can be determined. Suppose that "a" represents a slope of the reference straight line, "a'" represents a slope of the straight line of the unwanted object that is not the reference straight line, and $(x_A, y_A)$, $(x_B, y_B)$, and $(x_C, y_C)$ represent coordinates of viewpoints included in each viewpoint group. In this case, a straight line of a remaining image of the unwanted object is expressed by the following equation, for a viewpoint group in which all of the three viewpoints overlap the reference straight line.

$$y = ax + y_A - ax_A \quad [\text{EQUATION 2}]$$

Further, if the vector median filter processing is performed with use of a viewpoint group constituted by two viewpoints overlapping the reference straight line and another single viewpoint, a straight line and a point remain as the image of the unwanted object. In this case, the straight line and the point which remain after execution of the first processing are expressed by the following equation, assuming that $(x_C, y_C)$ is coordinates of the single viewpoint that does not overlap the reference straight line.

$$\text{STRAIGHT LINE: } y = ax + y_A - ax_A \quad [\text{EQUATION 3}]$$

POINT:

$$\left( \frac{y_A - y_C - a'(x_A - x_C)}{a - a'}, \frac{ay_A - a'y_C - a'(ax_A - a'x_C)}{a - a'} \right),$$

$$\left( \frac{y_B - y_C - a'(x_B - x_C)}{a - a'}, \frac{ay_B - a'y_C - a'(ax_B - a'x_C)}{a - a'} \right)$$

In this step, the remaining point calculation unit 2203 substitutes coordinates of the respective viewpoints included in each viewpoint group and the slopes of the straight lines corresponding to the unwanted object into the above-described equations, and outputs an acquired equation of the straight line and acquired coordinates of the point to the viewpoint set determination unit 2204.

Subsequently, in step S2310, the viewpoint set determination unit 2204 determines the three viewpoint groups to be used in the first removal. If only viewpoint sets in which all of the three viewpoints overlap the reference straight line at a same straight line position are detected as candidates of the viewpoint groups to be used in the first removal, the viewpoint set determination unit 2204 randomly selects three sets from them, and determines them as the viewpoint groups to be used in the first removal. At this time, the viewpoint set determination unit 2204 may select sets corresponding to straight line positions located away from one another. If a set/sets in which all of the three viewpoints overlap the reference straight line at a same straight line position, or a set/sets constituted by two viewpoints overlapping the reference straight line at a same straight line position and another single viewpoint are detected as candidates of the viewpoint groups to be used in the first removal, the viewpoint set determination unit 2204 determines an overlap of the remaining points. The viewpoint set determination unit 2204 searches for a combination of three viewpoint groups in which the respective remaining points do not overlap one another by comparing the equations of the straight lines and the coordinates of the points calculated in step S2309 among the respective groups. If there are two or more combinations of viewpoint groups in which the respective remaining points do not overlap one another at all, the viewpoint set determination unit 2204 randomly selects one of them, and determines it as the three viewpoint groups to be used in the first removal. If there is no combination of viewpoint groups in which the respective remaining points do not overlap one another at all, the viewpoint set determination unit 2204 selects a combination of viewpoint groups in which the respective remaining points least overlap one another, as the three viewpoint groups to be used in the first removal. The viewpoint set determination unit 2204 may make this determination about an overlap of the remaining points, assuming that the remaining straight lines and points have certain widths in consideration of the width of the unwanted object. The viewpoint set determination unit 2204 outputs information that indicates the viewpoint groups determined at this time, to the first removal unit 2002. Then, the processing ends.

According to the above-described configuration, when removing an unwanted object by combining images, the present exemplary embodiment can remove the unwanted object, even if the unwanted object has a lattice shape and the unwanted object cannot be removed by performing the vector median filter processing once due to the relationship between the unwanted object and the number and layout of the viewpoints from which images are captured. A complete removal of the image of the unwanted object requires images shot from at least nine different viewpoints. However, even when the present exemplary embodiment is employed for images shot from viewpoints less than that, the present exemplary embodiment can provide an effect of reducing a remaining image of the unwanted object. Further, the present exemplary embodiment performs the vector median filter processing with use of three different viewpoint groups respectively constituted by three viewpoints, but the number of viewpoint groups and the number of viewpoints included in each viewpoint group are not limited to these examples. For example, the number of viewpoints included in each viewpoint group may be five, and the number of viewpoint groups may be five.

<Other Exemplary Embodiments>

Embodiments of the present invention are not limited to the above-described configurations, and may be configured by combining the above-described plurality of exemplary embodiments. For example, in the third exemplary embodiment, the straight-line approximation of the unwanted object in each patch may be performed by the image recognition processing.

Figure 25A:
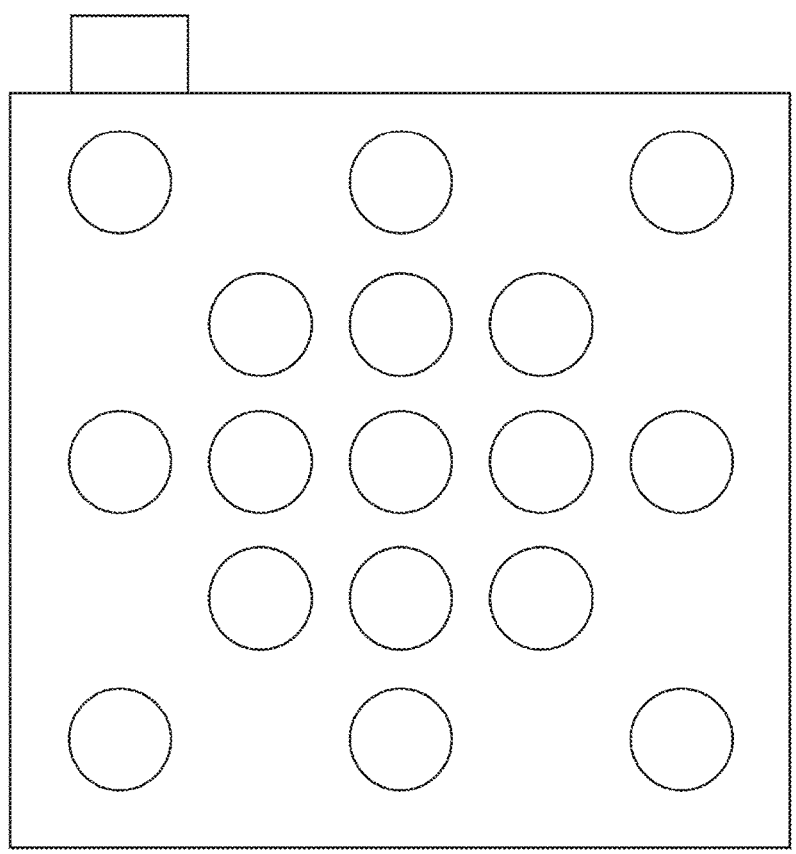
FIGS. 25A, 25B, and 25C illustrate examples of a layout of viewpoints of the camera.
Figure 25B:
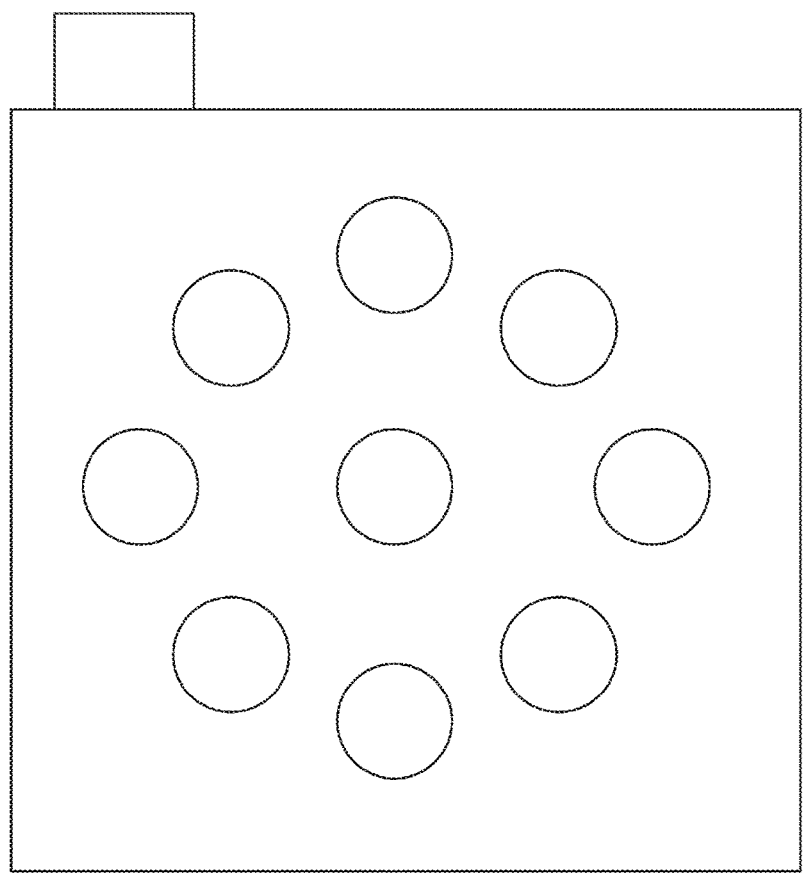
Figure 25C:
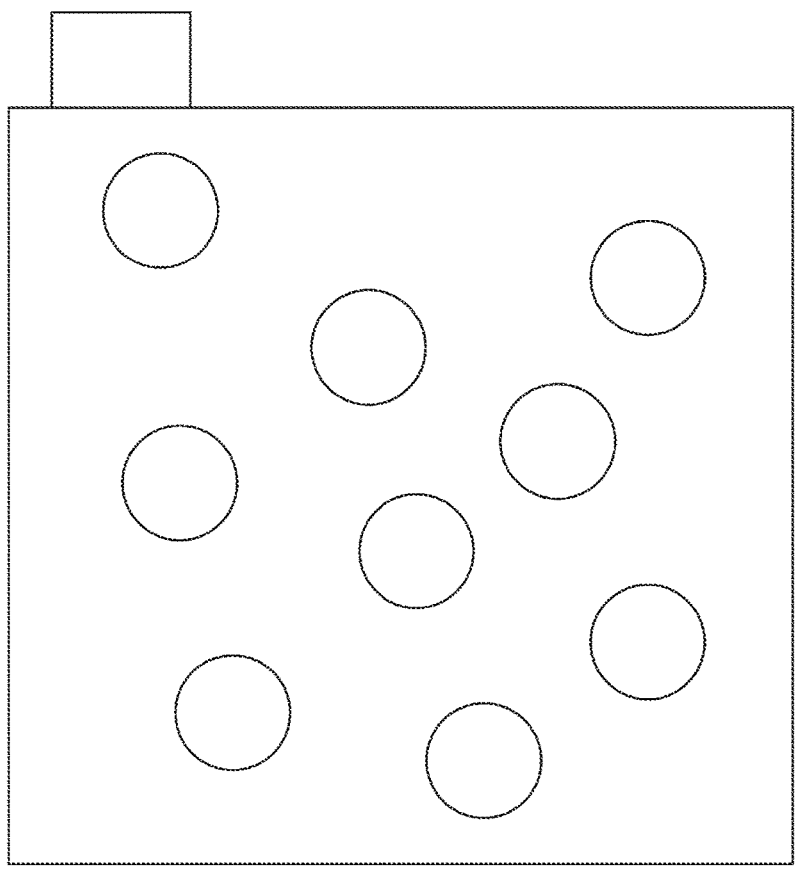

Further, in the above-described exemplary embodiments, the unwanted object removal processing is performed with use of images acquired from the array camera 100, 1300, 1500, or 1900, but the unwanted object removal processing may be performed with use of images acquired from any imaging apparatus that can acquire images corresponding to a plurality of viewpoints. For example, the unwanted object removal processing may be performed with use of images acquired from a plenoptic camera including a micro-lens array in front of an image sensor. Further, the above-described exemplary embodiments have been described based on the example in which the unwanted object removal processing is performed on images acquired with use of the array camera 100, 1300, 1500, or 1900 including the plurality of imaging units 101-125 or 1901-1909 arranged in a lattice manner. However, the configuration of the layout of the imaging units in the array camera is not limited to this example. For example, the present invention can be employed even for an array camera having imaging units arranged radially as illustrated in FIG. 25A. Further, the present invention can be also employed for an array camera including imaging units arranged circularly as illustrated in FIG. 25B, and an array camera including imaging units arranged randomly as illustrated in FIG. 25C.

Further, embodiments of the present invention are not limited to only a camera including imaging units and a processing unit, and may be an information processing system in which another computer performs a part of the processing performed in the above-described exemplary embodiments. For example, an embodiment of the present invention may be an information processing system which extracts images shot from specific viewpoints from among images acquired by a camera based on a shape of an unwanted object, and outputs the images to a computer, which performs the unwanted object removal processing.

Other Embodiments

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-143695 filed Jul. 9, 2013 and No. 2014-082017 filed Apr. 11, 2014, which are hereby incorporated by reference herein in their entirety.

What is claimed is:

1. An information processing apparatus configured to process a plurality of images which are acquired by imaging and correspond to different viewpoint positions, the information processing apparatus comprising:
    an acquisition unit configured to acquire information regarding a shape of an unwanted object included in the plurality of images;
    a selection unit configured to select a plurality of viewpoint positions from viewpoint positions from which images can be acquired by the imaging based on the information regarding the shape of the unwanted object; and a generation unit configured to generate image data in which at least a part of an image of the unwanted object is not included, with use of a plurality of images corresponding to the selected plurality of viewpoint positions, wherein the selection unit selects the plurality of viewpoint positions in such a manner that the selected viewpoint positions do not include a pair of viewpoint positions wherein a direction of a straight line connecting the viewpoint positions to each other is a same direction as a longitudinal direction of the unwanted object, wherein the information regarding the shape of the unwanted object includes information that indicates the longitudinal direction of the unwanted object.

2. The information processing apparatus according to claim 1, wherein the selection unit selects a plurality of viewpoint position groups each including a plurality of viewpoint positions, from the viewpoint positions from which the images can be acquired by the imaging, and wherein the generation unit includes a first processing unit configured to generate a plurality of first image data pieces each corresponding to any of the plurality of viewpoint position groups, as the image data in which at least a part of the image of the unwanted object is not included, and a second processing unit configured to generate, with use of the plurality of first image data pieces, second image data which is image data from which at least a part of the image of the unwanted object included in each of the plurality of first image data pieces is removed.

3. The information processing apparatus according to claim 1, wherein, if the image of the unwanted object is considered to have a straight-line shape, the information regarding the shape of the unwanted object includes information regarding a slope of the straight line.

4. The information processing apparatus according to claim 1, wherein the images processed by the information processing apparatus are images acquired by an imaging apparatus comprising a plurality of imaging units corresponding to the different viewpoint positions.

5. The information processing apparatus according to claim 4, further comprising a designating unit configured to designate the imaging units corresponding to the viewpoint positions selected by the selection unit among the plurality of imaging units, as imaging units to be used in acquisition of the images by the imaging apparatus, wherein the generation unit generates the image in which at least the part of the image of the unwanted object is not included, with use of the images acquired by the imaging units designated by the designating unit.

6. The information processing apparatus according to claim 1, wherein the generation unit selects, from the plurality of images acquired by the imaging, images corresponding to the viewpoint positions selected by the selection unit, and generates, with use of the selected images, the image in which at least the part of the image of the unwanted object is not included.

7. The information processing apparatus according to claim 1, further comprising an operation unit configured to input an operation, wherein the acquisition unit acquires the information regarding the shape of the unwanted object based on the operation of the operation unit.

8. The information processing apparatus according to claim 7, wherein the operation unit is a touch panel, and the information regarding the shape of the unwanted object is acquired based on a locus of a touched position on the touch panel.

9. The information processing apparatus according to claim 8, further comprising a display unit configured to display an image that includes the image of the unwanted object, wherein the touch panel is configured integrally with the display unit.

10. The information processing apparatus according to claim 1, wherein the information regarding the shape of the unwanted object is acquired from image recognition using the image(s) acquired by the imaging.

11. The information processing apparatus according to claim 1, wherein the plurality of images corresponding to the plurality of viewpoints selected by the selection unit includes such a combination of images that pixel regions corresponding to the image of the unwanted object, which are included in the respective images, are regions different from each other.

12. An imaging apparatus having a function as the information processing apparatus according to claim 1, and further comprising a plurality of imaging units.

13. An information processing system including an imaging apparatus and an information processing apparatus, the information processing system comprising:

an imaging unit configured to acquire a plurality of images corresponding to different viewpoint positions by imaging;

an acquisition unit configured to acquire information regarding a shape of an unwanted object included in the plurality of images;

a selection unit configured to select a plurality of viewpoint positions from among viewpoint positions from which images can be acquired by the imaging based on the information regarding the shape of the unwanted object; and a generation unit configured to generate image data in which at least a part of an image of the unwanted object is not included, with use of a plurality of images corresponding to the selected plurality of viewpoint positions, wherein the selection unit selects the plurality of viewpoint positions in such a manner that the selected viewpoint positions do not include a pair of viewpoint positions wherein a direction of a straight line connecting the viewpoint positions to each other is a same direction as a longitudinal direction of the unwanted object, wherein the information regarding the shape of the unwanted object includes information that indicates the longitudinal direction of the unwanted object.

14. An information processing method comprising:

acquiring a plurality of images which are captured by imaging and correspond to different viewpoint positions;

acquiring information regarding a shape of an unwanted object included in the plurality of images;

selecting a plurality of viewpoint positions from among viewpoint positions from which images can be acquired by the imaging based on the information regarding the shape of the unwanted object; and generating image data in which at least a part of an image of the unwanted object is not included, with use of a plurality of images corresponding to the selected plurality of viewpoint positions, wherein selecting the plurality of viewpoint positions in such a manner that the selected viewpoint positions do not include a pair of viewpoint positions wherein a direction of a straight line connecting the viewpoint positions to each other is a same direction as a longitudinal direction of the unwanted object wherein the information regarding the shape of the unwanted object includes information that indicates the longitudinal direction of the unwanted object.

15. A non-transitory computer-readable medium storing a program for causing a computer to perform the method according to claim 14.

\* \* \* \* \*